(12) United States Patent
Bass et al.

(10) Patent No.: US 11,334,234 B2
(45) Date of Patent: May 17, 2022

(54) OBJECT IDENTIFICATION SYSTEM

(71) Applicant: HY-KO PRODUCTS COMPANY, Northfield, OH (US)

(72) Inventors: Michael A. Bass, Chagrin Falls, OH (US); Richard W. Ryai, North Royalton, OH (US); Michael B. Hanish, Middlefield, OH (US); Chester O. D. Thompson, Painesville, OH (US); William R. Mutch, North Ridgeville, OH (US); David E. Shaner, Richmond Heights, OH (US); Joseph M. Work, Kirtland, OH (US)

(73) Assignee: HY-KO PRODUCTS COMPANY LLC, Portage, MI (US)

( * ) Notice: Subject to any disclaimer, the term of this patent is extended or adjusted under 35 U.S.C. 154(b) by 122 days.

(21) Appl. No.: 16/702,707

(22) Filed: Dec. 4, 2019

(65) Prior Publication Data
US 2020/0104035 A1 Apr. 2, 2020

Related U.S. Application Data

(63) Continuation of application No. 15/708,670, filed on Sep. 19, 2017, now Pat. No. 10,503,384, which is a
(Continued)

(51) Int. Cl.
*G06F 3/048* (2013.01)
*G06F 3/04847* (2022.01)
(Continued)

(52) U.S. Cl.
CPC ........ *G06F 3/04847* (2013.01); *G06F 3/0482* (2013.01); *G06F 3/04842* (2013.01);
(Continued)

(58) Field of Classification Search
CPC ............... G06F 3/04847; G06F 3/0482; G06F 3/04842; G07F 11/70; B23C 3/35;
(Continued)

(56) References Cited

U.S. PATENT DOCUMENTS 3,358,561 A * 12/1967 Roxburgh ................. B23C 3/35
409/83
3,884,121 A * 5/1975 Agius ....................... B23C 3/35
409/82
(Continued)

OTHER PUBLICATIONS

Supplemental European Search Report, Application No. 03767220. 1-2201, dated May 10, 2007.
(Continued)

*Primary Examiner* — Steven B Theriault
(74) *Attorney, Agent, or Firm* — McDonald Hopkins LLC

(57) ABSTRACT

A system and method for identifying objects possessing minute but significant details is described. At its core, the system includes a user interface, means for comparatively identifying the object and means for displaying results. Notably, because the system does not rely upon highly specialized or complex equipment, the invention is expected to have particular applicability in a wide variety of everyday situations. Moreover, the system is explicitly designed for user friendliness, so as to eliminate that need for extensive training for any prospective user of the system. The system should have particular applicability in key blank identification and key duplication processes.

18 Claims, 19 Drawing Sheets

Related U.S. Application Data continuation of application No. 14/850,094, filed on Sep. 10, 2015, now abandoned, which is a continuation of application No. 12/983,582, filed on Jan. 3, 2011, now abandoned, which is a continuation of application No. 10/633,933, filed on Aug. 4, 2003, now Pat. No. 7,890,878.

(60) Provisional application No. 60/452,893, filed on Mar. 7, 2003, provisional application No. 60/400,772, filed on Aug. 2, 2002.

(51) Int. Cl.
*G06F 16/245* (2019.01)
*G06F 16/242* (2019.01)
*G07F 11/70* (2006.01)
*G06F 3/0482* (2013.01)
*G06F 3/04842* (2022.01)

(52) U.S. Cl.
CPC ........ *G06F 16/245* (2019.01); *G06F 16/2428* (2019.01); *G07F 11/70* (2013.01)

(58) Field of Classification Search
CPC . B23C 2235/28; B23C 2235/12; B23C 3/355; Y10T 409/300952; G06Q 30/0601
See application file for complete search history.

(56) References Cited

U.S. PATENT DOCUMENTS

| | | | |
|---|---|---|---|
| 4,159,783 A | 7/1979 | Crasnianski | |
| 4,298,792 A | 11/1981 | Granholm et al. | |
| 4,519,522 A | 5/1985 | McElwee | |
| 4,539,703 A | 9/1985 | Clearman et al. | |
| 4,579,213 A | 4/1986 | Rhine et al. | |
| 4,666,351 A | 5/1987 | Marchal | |
| 4,812,985 A | 3/1989 | Hambrick et al. | |
| 5,132,661 A | 7/1992 | Pinnow | |
| 5,159,560 A | 10/1992 | Newell et al. | |
| 5,205,436 A | 4/1993 | Savage | |
| 5,212,649 A | 5/1993 | Pelletier et al. | |
| 5,271,698 A * | 12/1993 | Heredia | B23C 3/35 409/82 |
| 5,311,758 A | 5/1994 | Neitzke et al. | |
| 5,314,274 A * | 5/1994 | Heredia | B23C 3/35 409/81 |
| 5,351,409 A | 10/1994 | Heredia | |
| 5,433,096 A | 7/1995 | Janssen et al. | |
| 5,442,433 A | 8/1995 | Hoshino et al. | |
| 5,468,110 A | 11/1995 | McDonald | |
| 5,556,240 A * | 9/1996 | Almblad | B23C 3/35 409/81 |
| 5,576,504 A * | 11/1996 | Evers | G01N 35/1079 250/576 |
| 5,617,323 A | 4/1997 | Stansberry et al. | |
| 5,711,643 A * | 1/1998 | Parr | B23C 3/35 409/80 |
| 5,807,042 A | 9/1998 | Almblad et al. | |
| 5,908,273 A | 6/1999 | Titus et al. | |
| 5,974,844 A | 11/1999 | Harrelson et al. | |
| 6,065,911 A | 5/2000 | Almblad et al. | |
| 6,606,602 B1 * | 8/2003 | Kolls | G06Q 30/0222 705/14.23 |
| 6,707,381 B1 | 3/2004 | Maloney | |
| 6,801,829 B2 * | 10/2004 | Kawai | B23C 3/35 700/161 |
| 6,812,838 B1 | 11/2004 | Maloney | |
| 6,895,100 B1 | 5/2005 | Pacenzia et al. | |
| 7,315,403 B2 | 1/2008 | Konishi | |
| 2001/0034565 A1 | 10/2001 | Leatherman | |
| 2002/0031251 A1 | 3/2002 | Campbell et al. | |
| 2002/0065680 A1 | 5/2002 | Kojima et al. | |
| 2002/0065712 A1 | 5/2002 | Kawan | |
| 2002/0090132 A1 | 7/2002 | Boncyk et al. | |
| 2002/0158751 A1 | 10/2002 | Bormaster | |
| 2002/0161476 A1 | 10/2002 | Panofsky et al. | |
| 2002/0173875 A1 | 11/2002 | Wallace et al. | |
| 2002/0191849 A1 | 12/2002 | Campbell et al. | |
| 2003/0028284 A1 | 2/2003 | Chirnomas | |
| 2003/0204289 A1 | 10/2003 | Banerjee et al. | |
| 2004/0050855 A1 | 3/2004 | Jurgenson | |

OTHER PUBLICATIONS

European Office Action, Application No. 03767220.1-2201, dated Dec. 13, 2007.
European Office Action, Application No. 03767220.1-2201, dated Aug. 18, 2010.
ISA / US, International Search Report and Written Opinion, PCT/US2008/000294, dated Apr. 3, 2009.
Mexican Office Action, Application No. PA/a/2005/001361, dated Apr. 16, 2010. (translation unavailable).
Mexican Office Action, Application No. PA/a/2005/001361, dated Feb. 10, 2011. (translation unavailable).
ISA / US, International Search Report, PCT/US2003/024517, dated Nov. 25, 2003.
ISA / US, Written Opinion, PCT/US2003/024517, dated Jun. 3, 2004.
ISA / US, International Preliminary Examination Report, PCT/US2003/024517, dated Feb. 3, 2005.

\* cited by examiner

OBJECT IDENTIFICATION SYSTEM

CROSS-REFERENCE TO RELATED APPLICATIONS

This application is a continuation of U.S. patent application Ser. No. 15/708,670 filed on Sep. 19, 2017 entitled "OBJECT IDENTIFICATION SYSTEM", which is a continuation of: U.S. patent application Ser. No. 14/850,094 filed on Sep. 10, 2015 entitled "OBJECT IDENTIFICATION SYSTEM" which is a continuation of U.S. patent application Ser. No. 12/983,582 filed on Jan. 3, 2011 entitled "OBJECT IDENTIFICATION SYSTEM" which is a continuation of U.S. patent application Ser. No. 10/633,933 (now U.S. Pat. No. 7,890,878) filed on Aug. 4, 2003 entitled "OBJECT IDENTIFICATION SYSTEM" which is related to, and claims all benefits under of 35 U.S.C. 119(e), to the Provisional Patent Application Ser. No. 60/452,893 entitled "OBJECT IDENTIFICATION SYSTEM" and filed on Mar. 7, 2003 and the Provisional Patent Application Ser. No. 60/400,772 entitled "IDENTIFICATION SYSTEM" and filed on Aug. 2, 2002, each of which is hereby incorporated by reference in its entirety.

FIELD OF INVENTION

This invention relates generally to the field of systems for identifying objects and, more particularly to systems for utilizing electronic means for identifying key blanks that are functionally compatible with an unknown key for use in a key duplication system.

BACKGROUND OF INVENTION

The identification of objects that are relatively fungible, but possess minute yet important nuances or details, can be a difficult, tedious and time consuming affair. As will be readily recognized by those familiar with such enterprises, a failure to accurately identify such objects with regularity can have unintended or undesirable consequences.

The identification process commonly used by locksmiths when making duplicate copies of a key is illustrative of such difficulties. The art of key replication is well known, insofar as the key intended for duplication (the master key) is simply copied on to an appropriately identified key-blank utilizing any number of different systems known in the art. In doing so, it is of the utmost importance that each master key be copied onto the proper key-blank so as to prevent numerous adverse consequences caused by reproducing a master key onto an inappropriate key-blank. However, choosing the correct key-blank can be difficult even for experts in the field.

There are hundreds, if not thousands, of key-blanks, and many blanks are not readily distinguished from others. Identifying the correct key-blank for use in duplication involves selecting a blank from hundreds or even thousands of possibilities, where differences between key-blanks may be very subtle. These hard-to-notice subtleties significantly increase the level of difficulty for all operators of such key replication systems, both inexperienced trainees and experts alike.

Once a key-blank is chosen, it goes through a cutting process. The typical cutting process simply traces the profile of the master key onto the key blank, such that the key-blank will exactly match (within the error limits and accuracy of the tracing machine) the original master key. Normally, a mechanically linked cutting wheel actually cuts into the key-blank, while it mimics the movement of the tracer as the tracer moves longitudinally along the profile of the master key. If the incorrect key-blank is provided during this process, the key-blank being formed into the duplicate key may not possess the correct longitudinal length, thereby causing a failure. When this type of failure occurs, the entire process of selecting a key-blank for replication and then mechanically cutting the key must begin again. Worse still, if the blank has the proper length but does not possess the appropriate thickness, contour, groove or other traits, the failure may not be discovered until the key is actually inserted into the lock.

Businesses that offer key cutting services are often times not staffed by experienced locksmiths. Instead, employees are usually trained to "eyeball" what is thought to be the correct blank and then cut a duplicate key. Such informal and imprecise key-blank identification invariably increases the rate of failures for the duplication process.

These failures often occur, at the expense of the industry and to the extreme dismay of the key holder. An accurate, easy-to-use key-blank identification system that increases the accuracy and efficiency of key replication and duplication would be welcomed by the industry.

Not surprisingly, numerous attempts have been made to improve identification systems and/or key replication systems. Generally speaking, these efforts can be grouped in two basic categories: image based methods and physical recognition systems.

The image-based methods essentially rely upon optical devices to create a digital representation of the key. This digitized image is then manipulated for identification and other purposes. Examples of these systems are shown in U.S. Pat. Nos. 5,807,042; 5,908,273; 6,064,747 and 6,406,227. Notably, each of these systems require specific arrangements cameras, lasers and/or scanning devices, in conjunction with a computer processor, to achieve their respective purposes, thereby increasing complexity and cost.

In contrast, physical recognition systems are similar to the previously stated method of "eyeballing" a key-blank. As seen in U.S. Pat. No. 5,351,409, a set of identification boxes is required to assist the user in a systematic comparison of prospective key-blanks. Such key-blank boxes can be bulky, difficult to update and inconvenient to store and maintain. Furthermore, the operator's judgment is still vital to the process, insofar as the ultimate result is directly tied to the operator's specific sequential determinations in comparing the key blade with the standard blanks that are provided. Most significantly, even with dedicated key blank boxes (which typically have test slots into which the original key is inserted to check for a proper fit), the minute differences in some blanks may still permit the original to fit properly into the wrong key blank's test slot, thereby resulting in a failure of the identification system.

The shortcomings of these previously known systems are numerous. In both cases above (i.e., image-based or physical recognition systems), specialized equipment is required. Moreover, these previously known methods do not provide for any automated tracking of inventory, nor do they readily permit systematic tracking of other variables that may be of interest. Further, none of the previously known systems appear to be readily adaptable to non-key-blank identification applications, nor do they seem to be allow for the use of common consumer computer systems and other similar construction materials (such as off-the-shelf personal computers, personal digital assistants, LEDs, etc.). Finally, to the extent that many of these systems must be operated by skilled technicians or specially trained employees, the consumer feels disconnected from the process and, in all likelihood, will feel even more annoyed and dismayed if a failure occurs in using these systems.

SUMMARY OF INVENTION

It is therefore a primary object of the present invention to provide a relatively simple key-blank identification method and apparatus that can identify an identical or functionally compatible key blank from basic information provided by the user, with absolute accuracy and without the need for highly-specialized equipment or training.

Another object of the present invention is to provide an apparatus and method, based upon simple parameters and without the need for complex imaging systems or bulky comparative devices, to identify key blanks or any number of other objects having minute details or subtle nuances from an original provided by the user.

Another object of the present invention is to provide an identification method and apparatus that is: (a) easy to use, (b) relatively inexpensive to construct and operate and (c) highly reliable in terms of both its functioning and its results.

Still another object of the present invention is to provide an identification system that may be operated with minimal required training for the user and that may be implemented with minimal expense.

Yet another object of the present invention is to provide a generalized identification method and apparatus that includes an electronic database of information concerning an array of objects for identification that can be readily monitored and easily updated or expanded.

A final object of the present invention is to provide a user-friendly interface and display that permits everyday consumers to directly interact with and control the identification process, along with any other subsequent, automated processes that may be associated therewith.

The present invention, as defined by the following description, drawings and appended claims, fulfills these objects and others by providing an interactive system having a user interface for inputting specified variables related to an object that are observed by the user of the system. The user interface is operatively associated with database means for comparing the user-provided input against one or more sets of data in order to identify an appropriate master object for the user. The results of this identification process are then made known to the user via display means. This particular arrangement of elements is expected to have particular applicability in the area of key-blank identification.

The invention further comprises a computer, having a graphical user interface for inputting specified variables, again observed by the user, that are related to the object, and a database for comparing these input variables to known data in order to identify an appropriate match, operatively associated with a display for indicating the results to the user.

In each of the instances above, the invention may also include a tracking means for recording and monitoring variables related to the utilization of the system, including information about the user, the user's actions and the objects identified by the system. Automated assistance means can also be provided to further assist the user. A specially designed display rack for indicating the results to the user is also contemplated. Finally, computerized network means for linking a plurality of the aforementioned elements is also claimed.

DETAILED DESCRIPTION OF THE INVENTION

Figure 1:
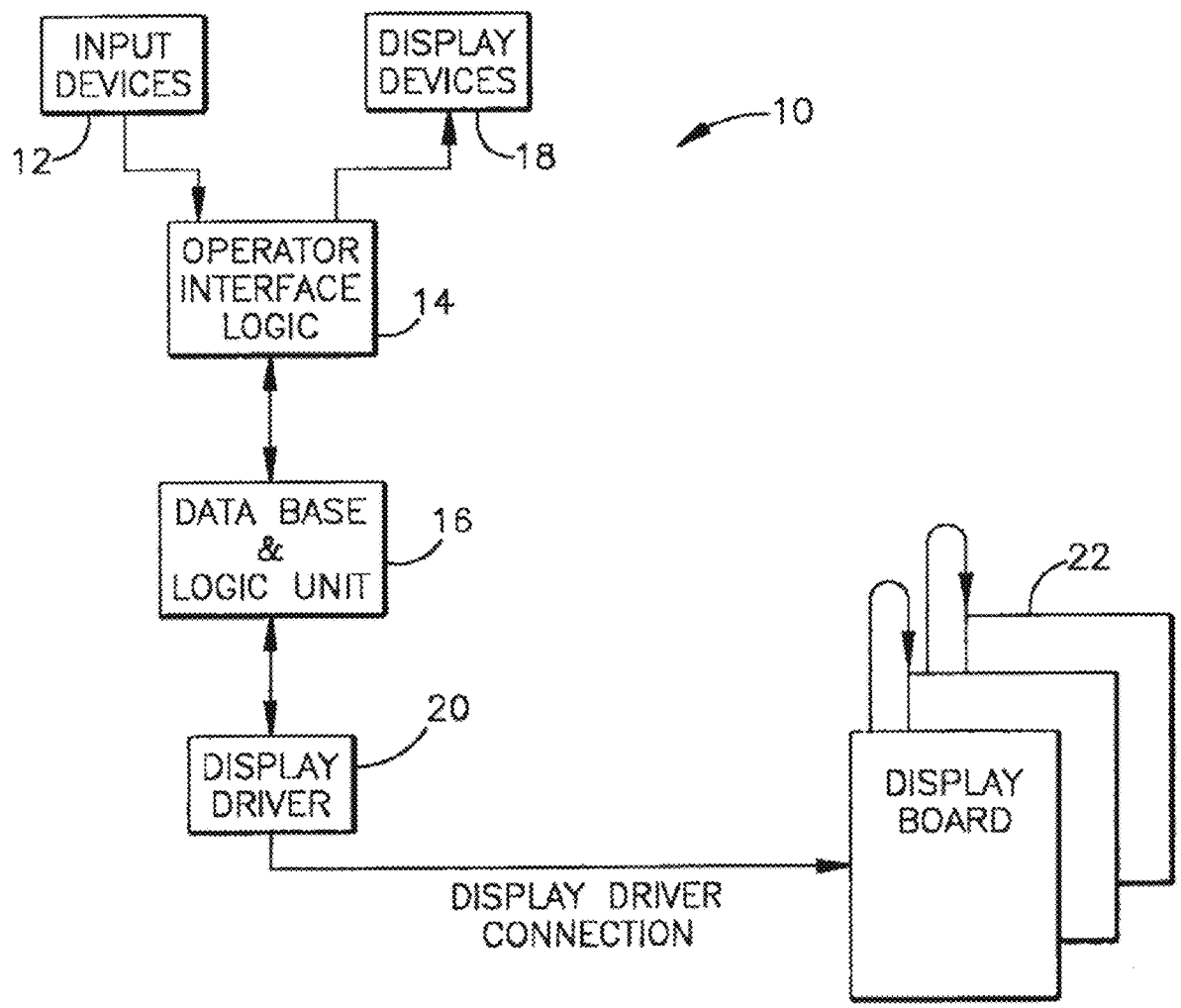
FIG. 1 shows a schematic representation of a possible configuration for the system of the present invention.
Figure 2:
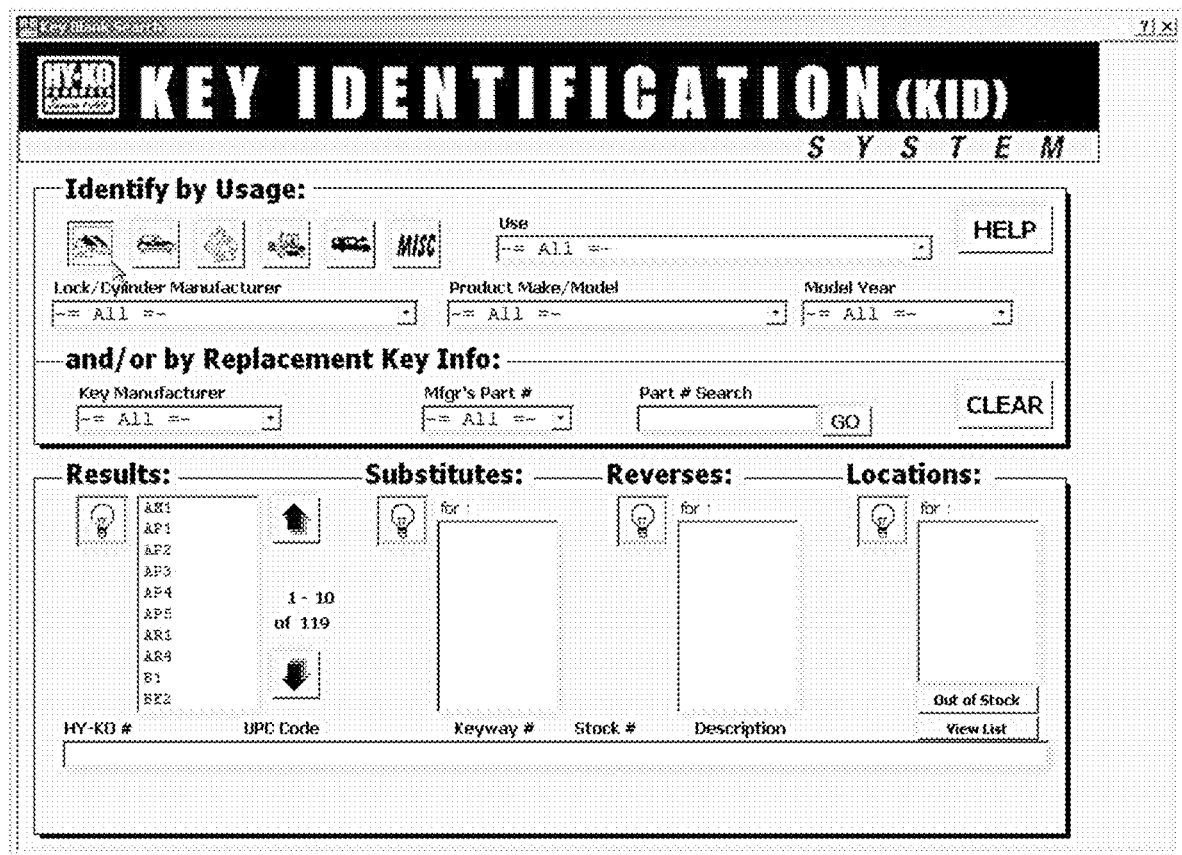
FIGS. 2 through 14 are screenshots of a possible user interface showing possible master key information for input into the system.
Figure 3:
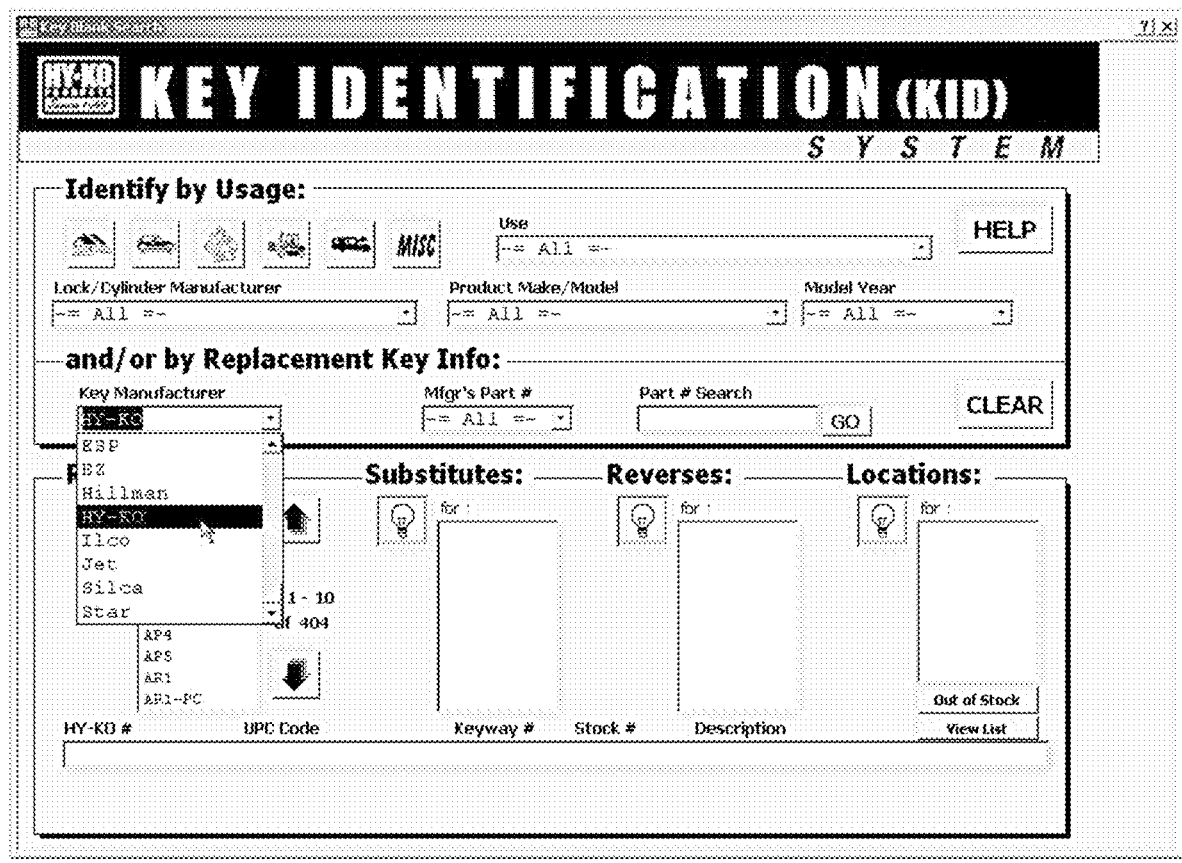
Figure 4:
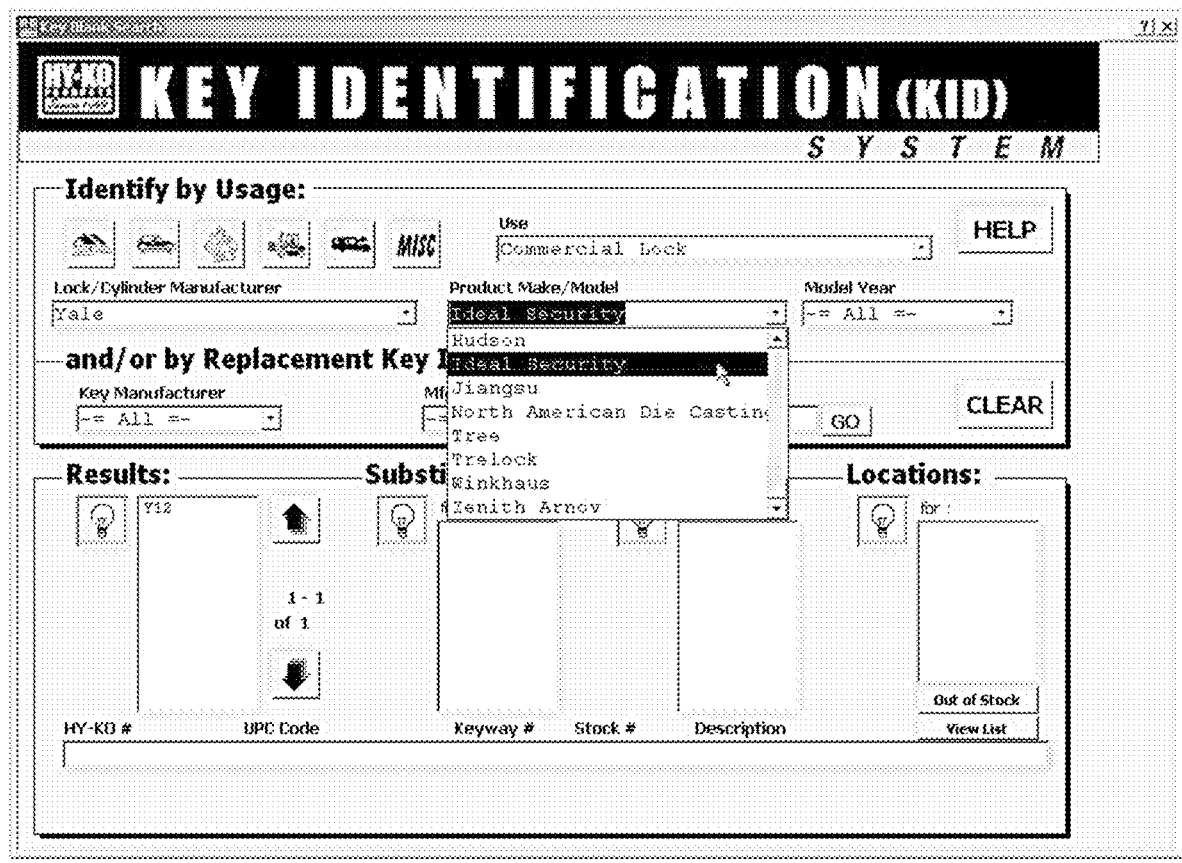
Figure 5:
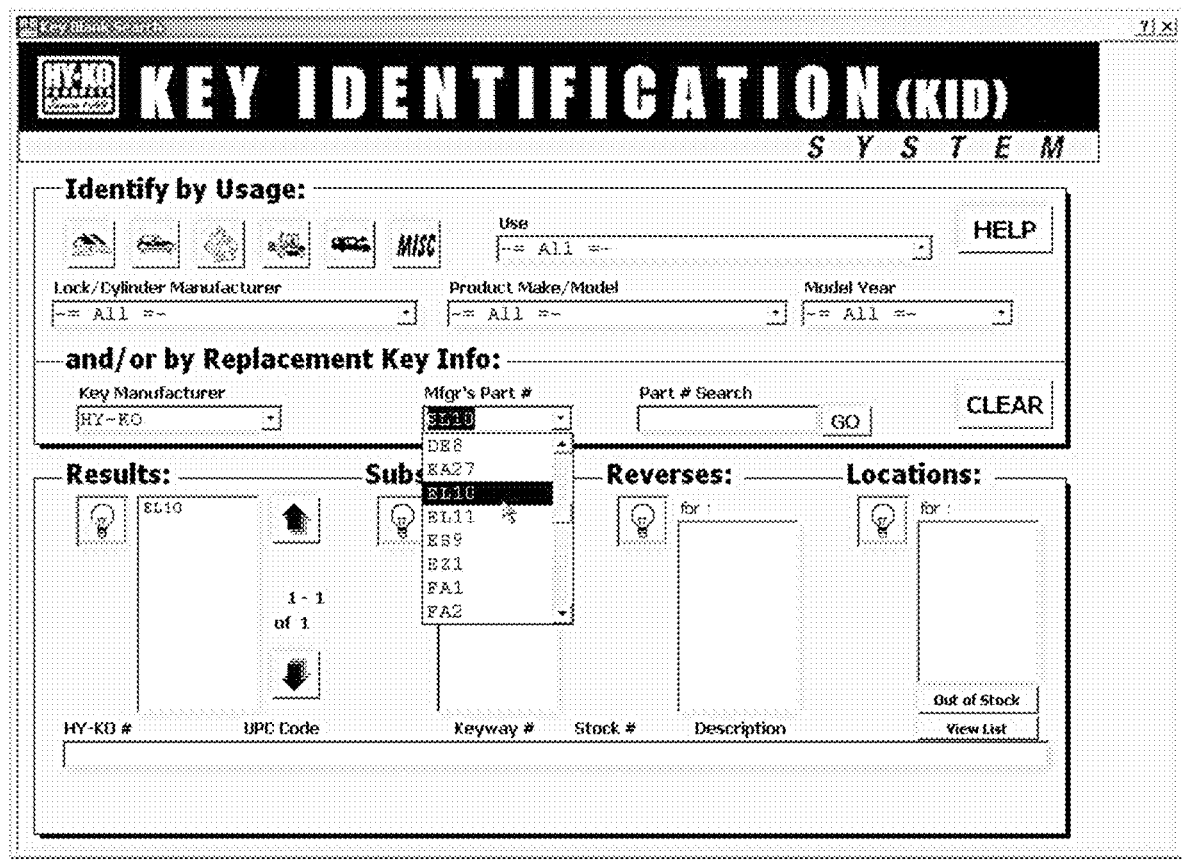
Figure 6:
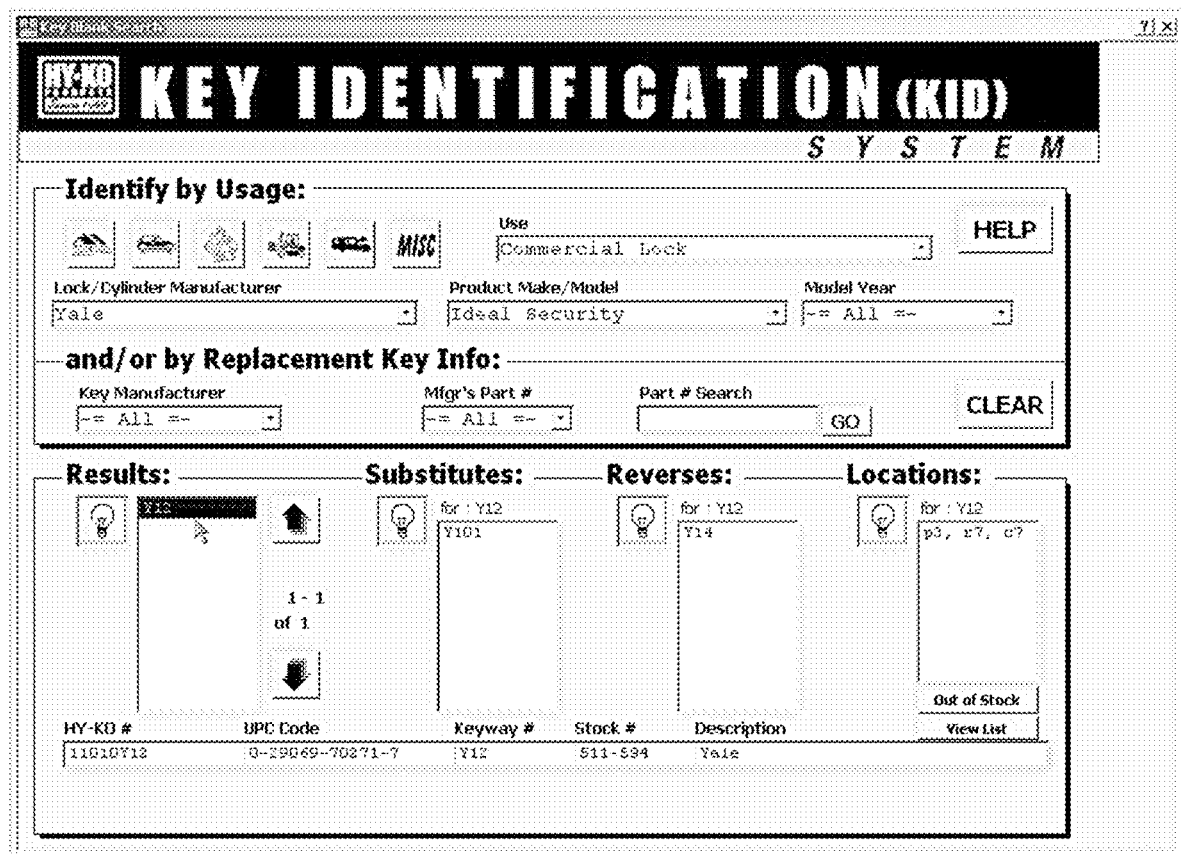
Figure 7:
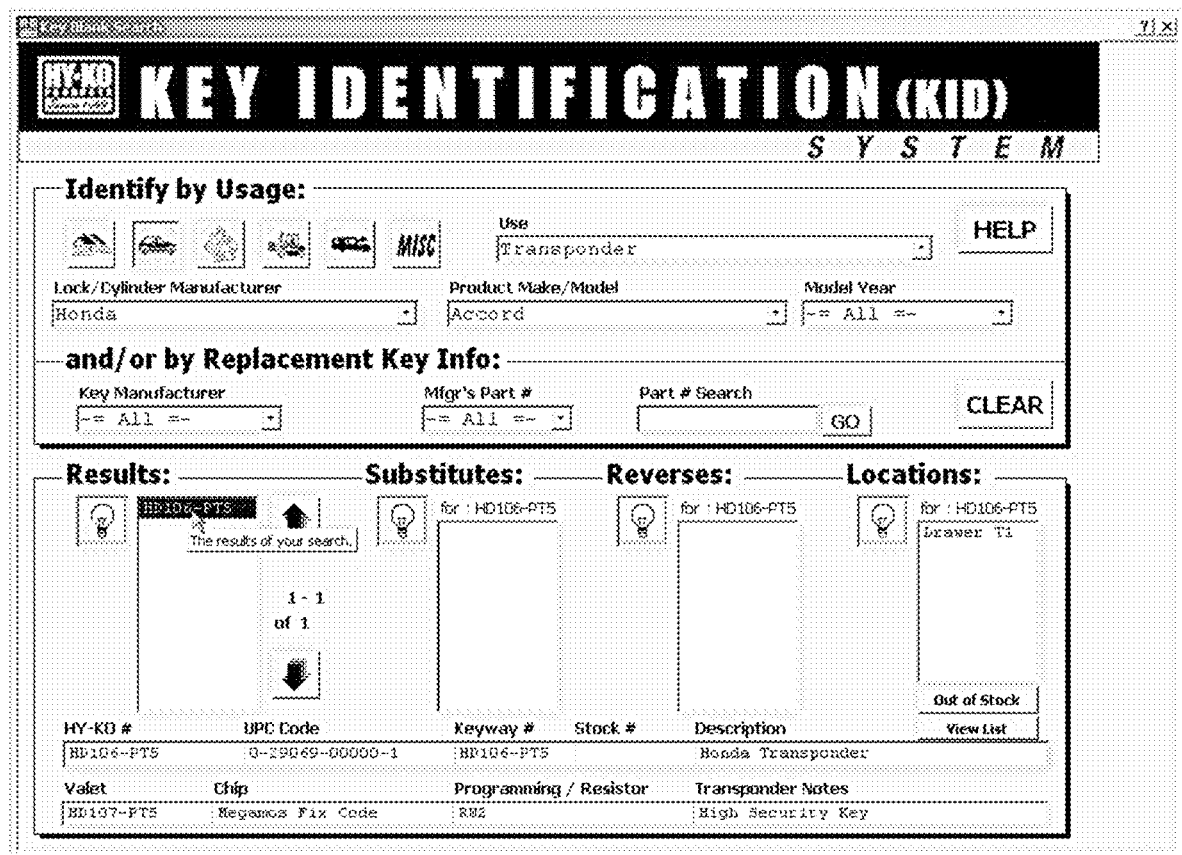
Figure 8:
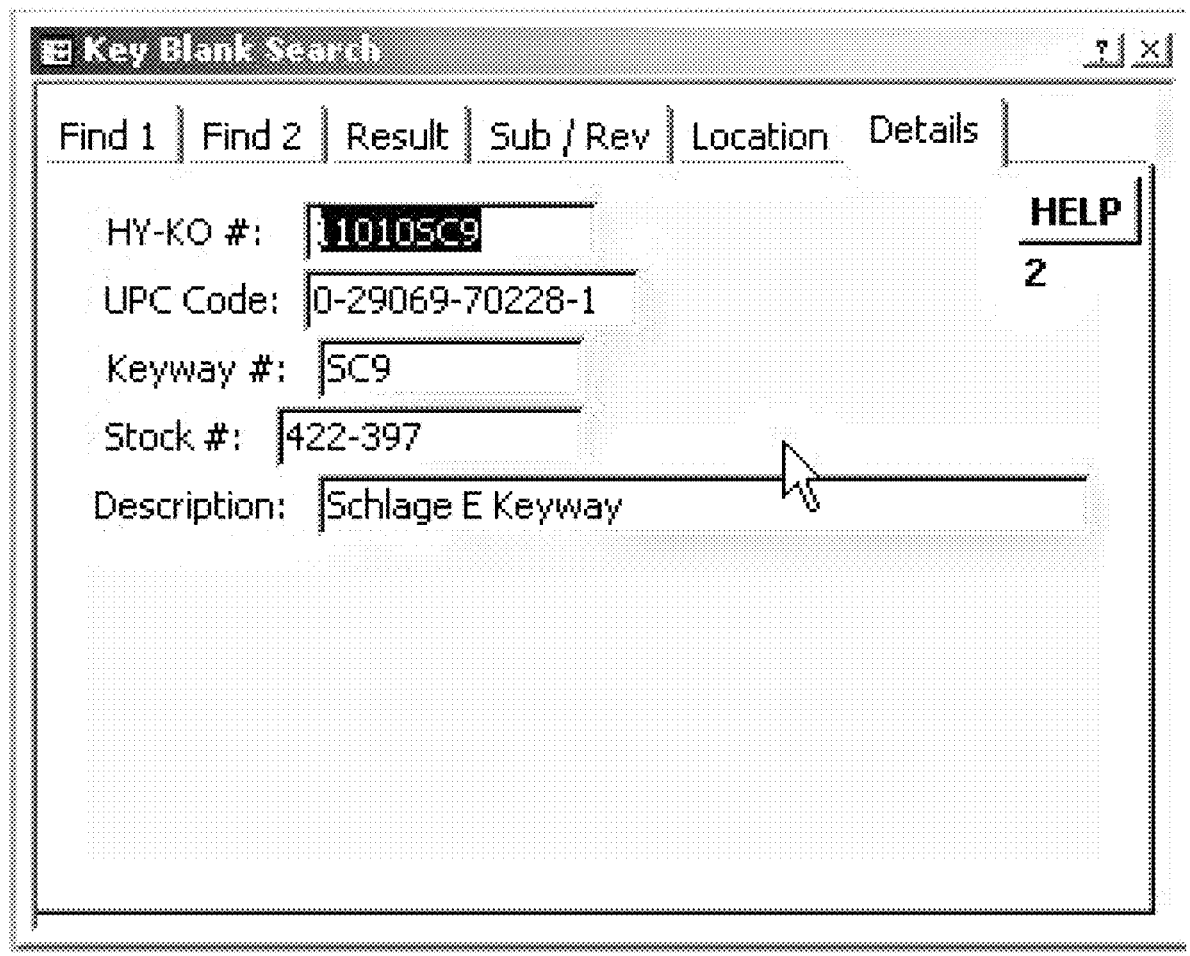
Figure 9:
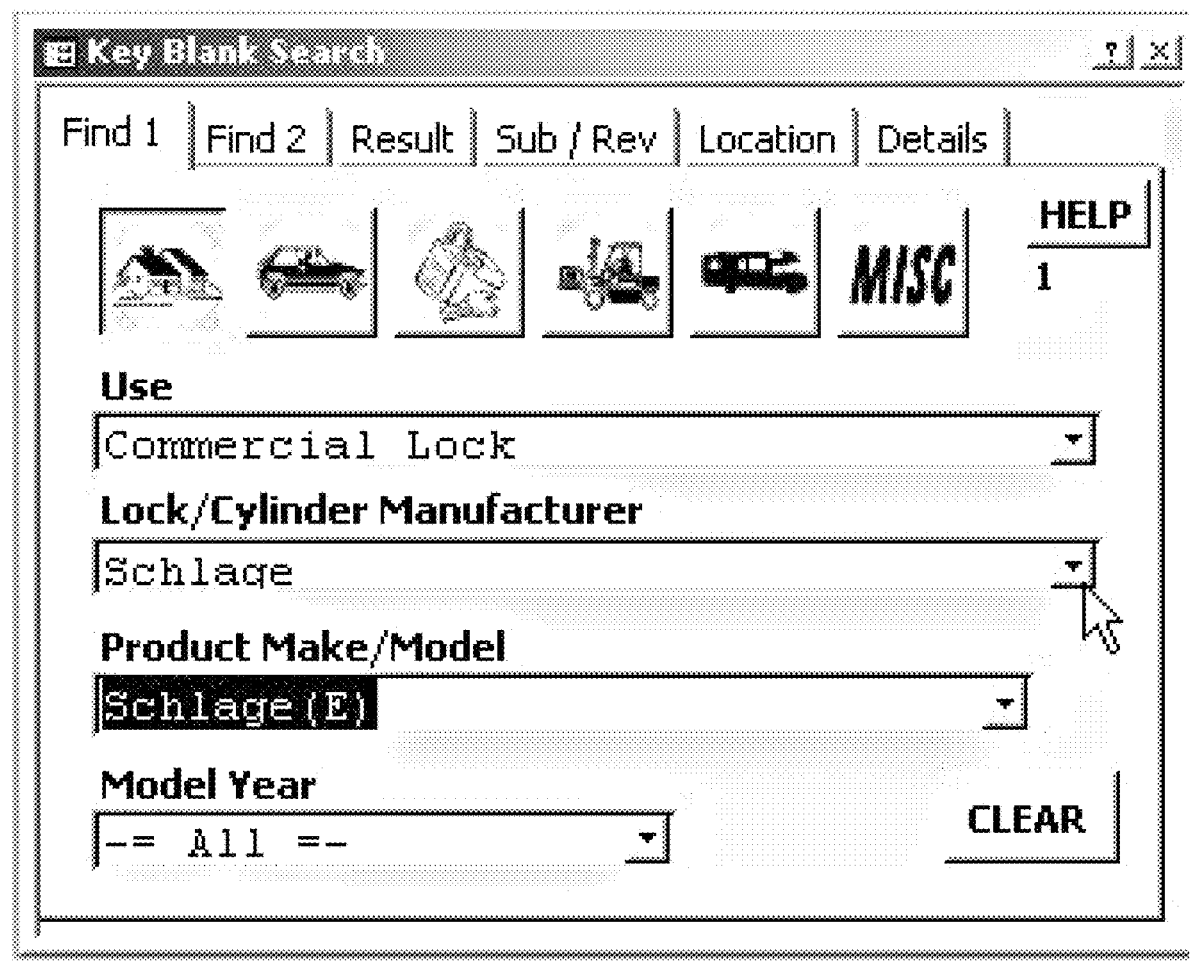
Figure 10:
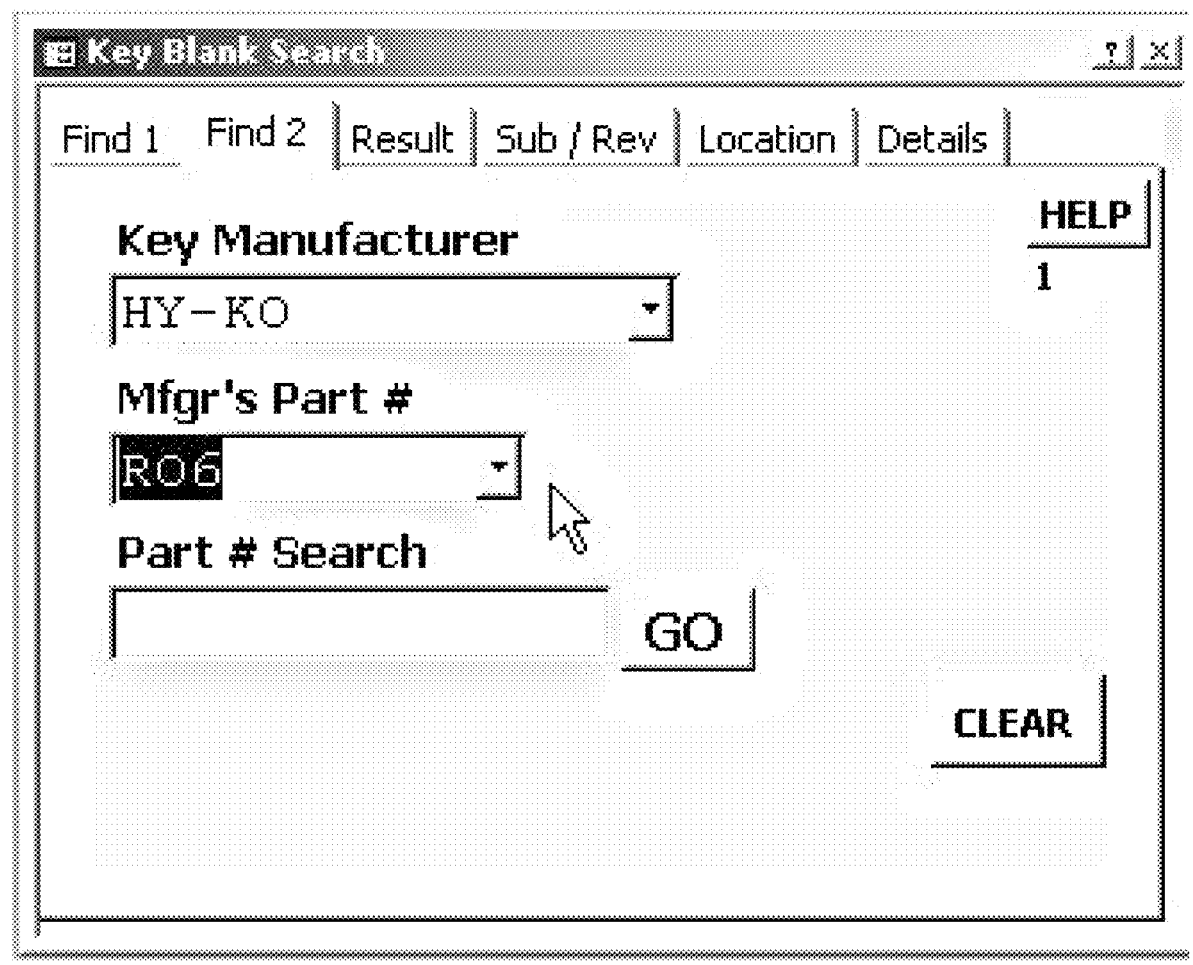
Figure 11:
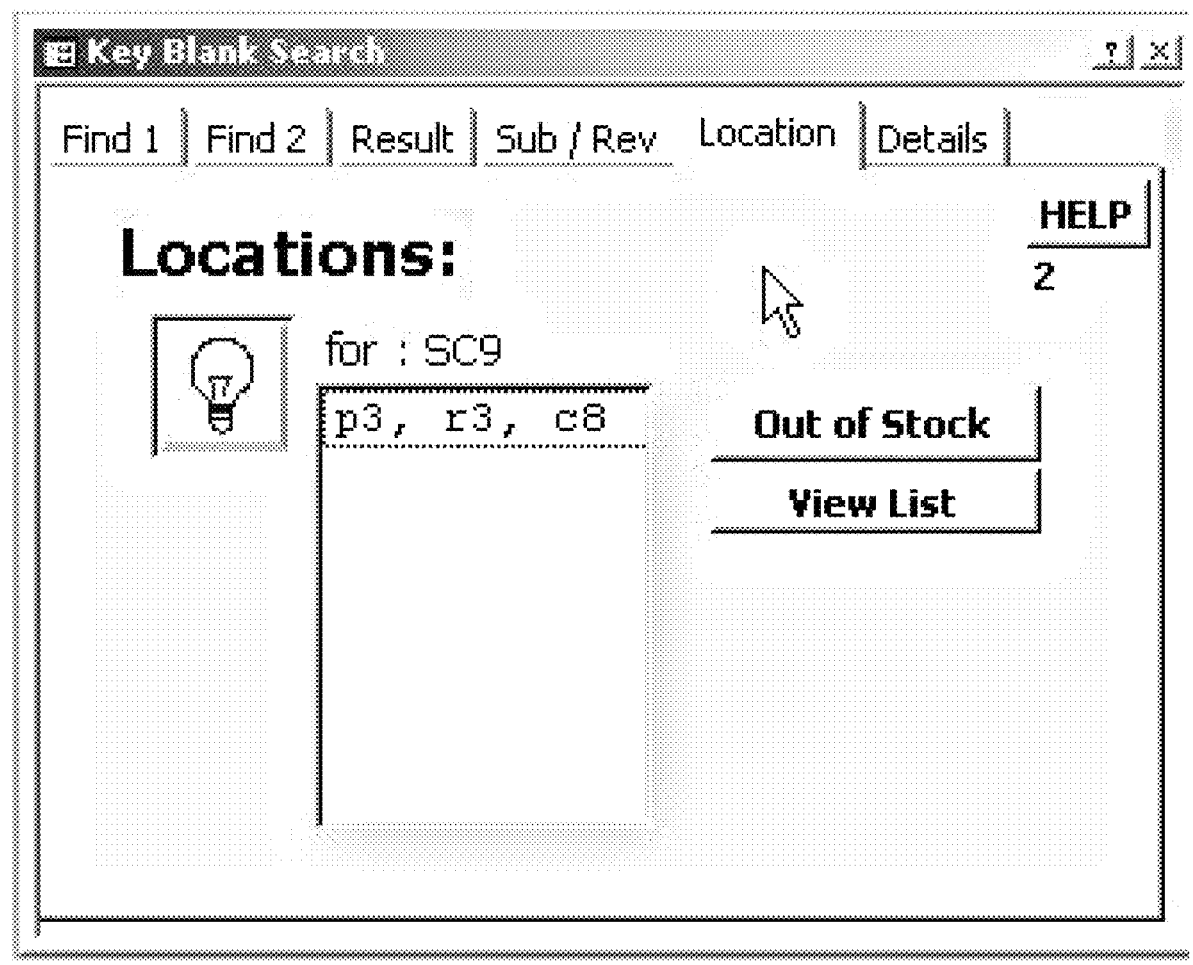
Figure 12:
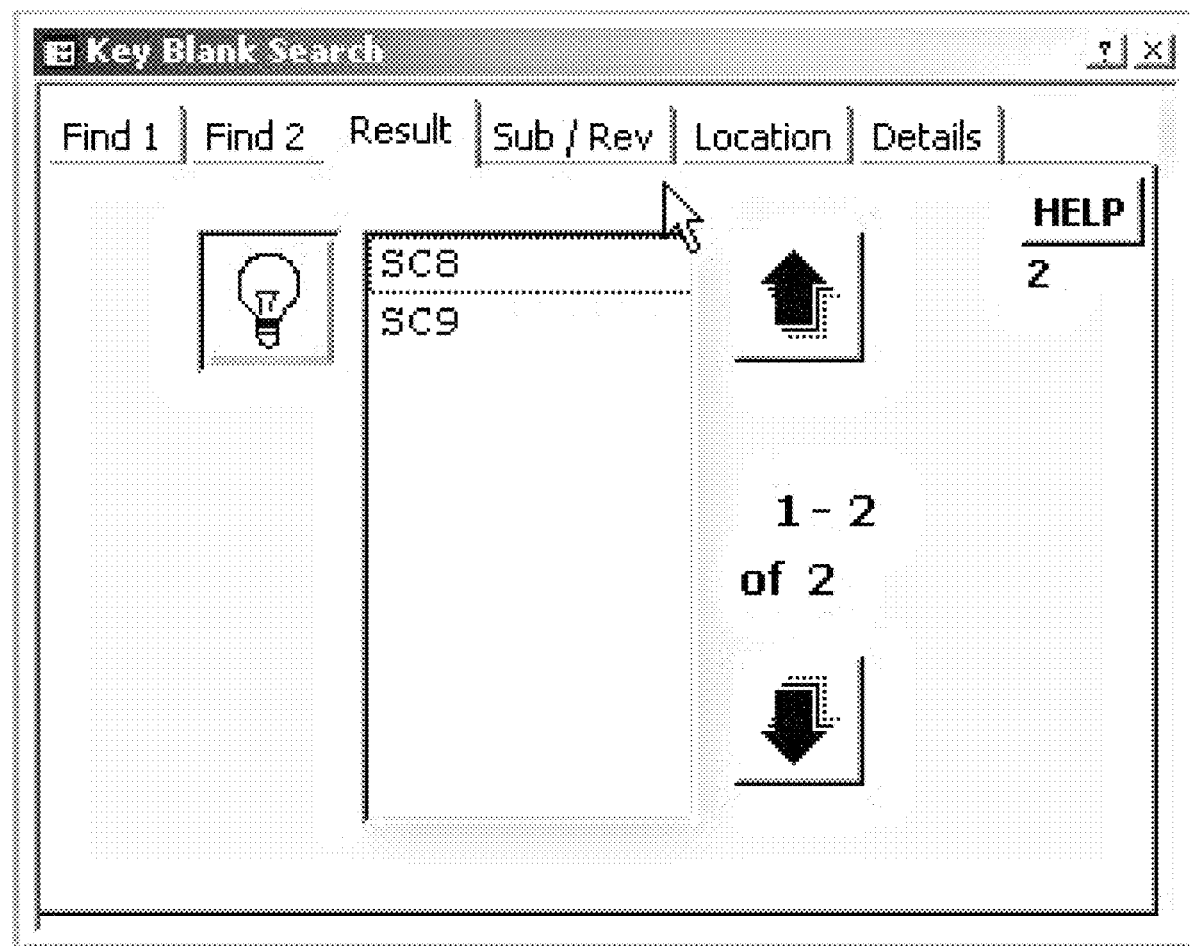
Figure 13:
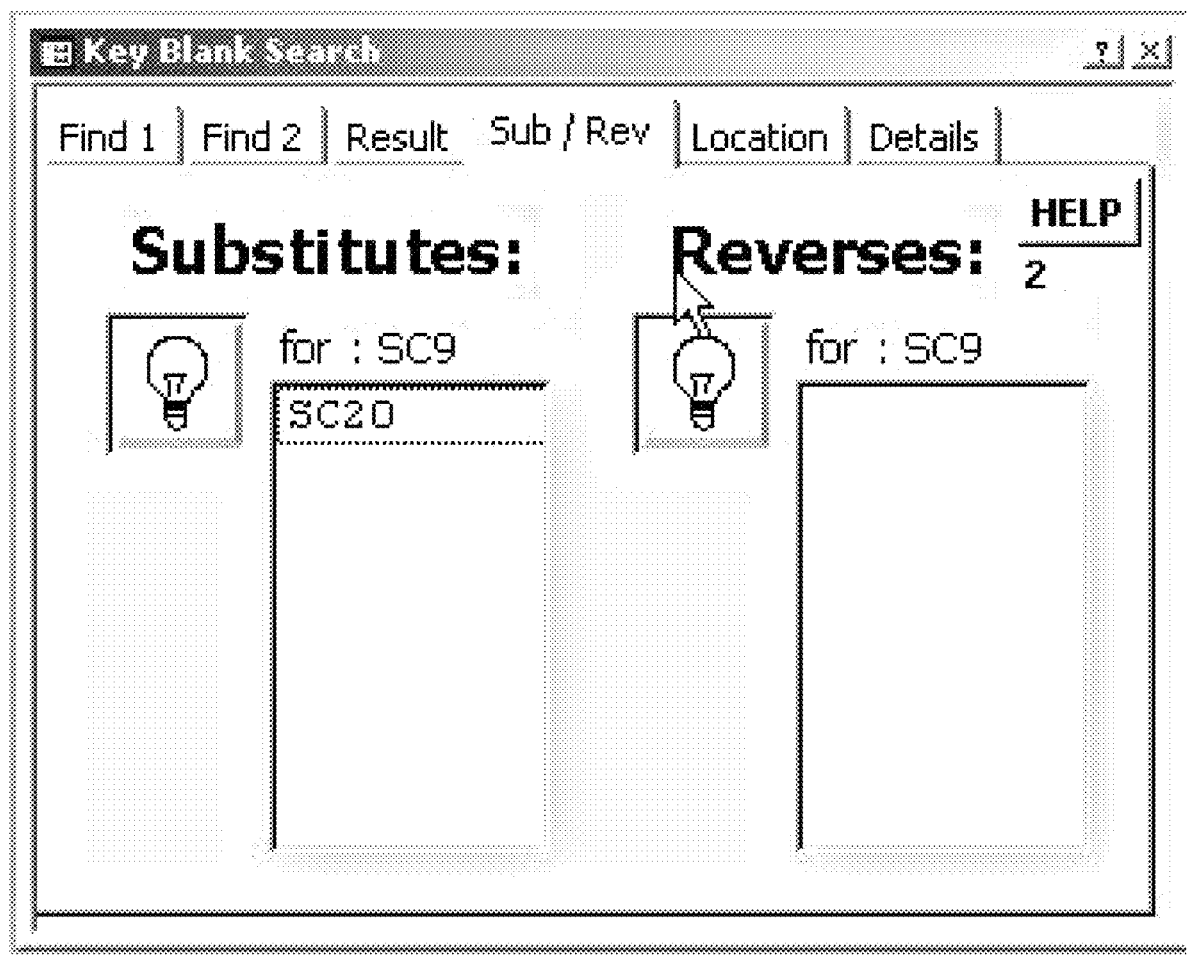
Figure 14:
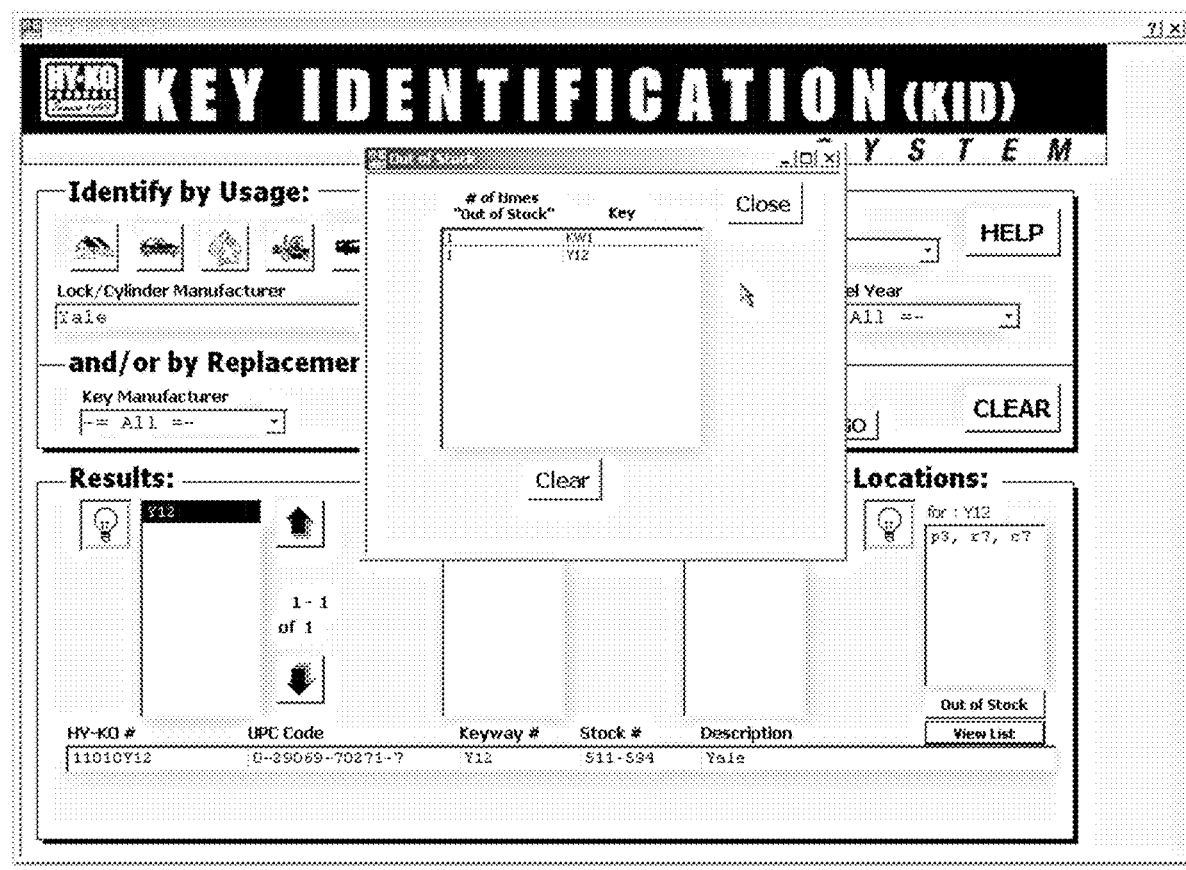

The present invention provides its user with a simple means for systematically identifying objects possessing minor, yet extremely important, physical differences. The invention is implemented using relatively simple techniques and without the need for complex, specialized equipment or extensive user training. The invention will have particular applicability in the field of key replication, although it should be understood the invention is equally applicable in any number of other fields where a multiplicity of relatively fungible components are prevalent, including but not limited to fasteners, auto parts, home furnishings, tools, computer-related products, office supplies and the like. Moreover, it should be understood that the invention is expressly designed to be user-friendly in order to encourage its widespread implementation in a consumer-oriented environment. In fact, users of the inventive system will most likely be customers seeking to identify and purchase the object that is identified by the system or relatively unskilled laborers in need of identifying objects in remote or field-based situations (rather than trained employees or experts).

The invention itself relies upon a database to transform operator inputs, provided through an operator interface, to accurately identify an appropriate match or matches for the object in question. Typically, the input will be based upon easily identifiable traits found on the object, such as product or serial numbers, brand names, intended use(s) of the object (e.g., a house key versus a car key or number 2 Phillips head screw driver versus a regular flat blade) and the like. In keeping with the invention's stated goal of user-friendliness and in stark contrast to the physical recognition system described above, only limited (if any) physical manipulation of the object or reliance upon other implements is necessary in order to determine these inputs.

For example, with respect to a system for key identification, some typical inputs required (and the corresponding values contained in the database) might include: the key-blank manufacturer name, key-blank manufacturer number, master-key type/use, master-key subtypes, applications for each HY-KO/EZ-Number, a list of retailer stock numbers for each HY-KO/EZ-Number, a list of exact substitutes for each HY-KO/EZ-Number, a list of display rack locations for each retailer stock number, and a list of automotive transponder notes by make, model, and year. Similar information fields could be utilized in order to identify the other objects to the invention is also applicable, such that an identification system for fasteners might include fields like: shape of the fastener's head, shape of the fastener's axis, overall size, intended use, desired strength, etc. Ultimately, the nature of the information will be inherent to the peculiarities of the object itself.

The database itself may be used and accessed as locally installed software, as a network-based application, as part of an integrated circuit or in any other known manner. As above, the intended use of the invention will impact the precise means by which the database is included in or delivered to the inventive system. For example, with respect to a key identification system, the most practical implementation scheme may be through the use of a common, over-the-counter personal computer, in conjunction with the elements described below, so as to allow for easy and widespread implementation as a user-friendly kiosk in hardware stores and other retail locations.

Functionally, the database compares and cross-references a plurality of known values against at least one input provided by the user in a manner that is well known to those skilled in the arts of software and computer-related inventions. This database information can be updated periodically based upon use of the system, specific inputs by the user or according to a set schedule. While it is presently preferred to have the database and associated information stored locally on a device, it is contemplated that such information could also be accessed via the world wide web or obtained from a remotely located database via a computerized network (e.g., local area network, wide area network, etc.).

In some cases, the database output may include a number of items which represent a set of the closest or most appropriate matches for the user. In these instances, the database itself will be programmed to automatically search for and determine the occasions when multiple matches are appropriate, and the output from the database to the user will be provided accordingly.

The operator interface, and the ultimate database output, should be based upon a familiar and user-friendly system. Touch screens, dedicated push buttons (e.g., YES, NO, etc.), mouse like pointers, regular computer keyboards and/or similar input devices—that are familiar to an average consumer—are the preferred embodiment of this interface. Further specifications for a preferred embodiment of the operator interface, along with numerous other details related to the specific application of these inventive principles to a key identification system, are given in the first example below. Likewise, the output display should be in the form of a monitor, printed material or visual display. While the graphical user interfaces and the various types of visual display devices are discussed at length throughout this specification, a particular form of a visual display rack is described in detail in the second example below. Finally, to the extent that the invention may incorporate or rely upon software, the third example below is devoted to discussing the functions of such software, as well as an alternative embodiment for the graphic user interface which may assist in reducing the computing demands of that software.

The invention may include other related software applications, in conjunction with the database, to further increase the accuracy and efficiency of the system. These applications include, but are not limited to the following:

(a) an inventory database that can track system use and remind the retailer to order or automatically reorder objects that may be in low supply;

(b) an update utility for the database to permit incorporation of new or replacement information for the objects;

(c) a "Help System" that explains the identification process and includes trouble shooting guide(s) for the invention itself, along with any secondary systems that may be incorporated with the invention (see below for further details). The Help System may also incorporate a training video or system to educate the retail employee or customer regarding the identification process (or secondary process, to the extent the system is incorporated into a further processing system, such as the automated key replication system contemplated by portions of the first example below) if the device a point-of-purchase device; and (d) a historical log that provides detailed tracking of the results provided to the user. Such tracking logs may be helpful in determining user preferences, enhancing marketing strategies, automatically adjusting the settings of the system to display certain items or preferentially request certain inputs and other reasons that will be inherent to the particular application in which the invention is used. These logs will be particularly useful in the event that the identification system is linked to mass communication systems such as a computerized network or the internet. Also, these logs could, in some instances, be operatively connected to or part of the aforementioned inventory database.

Notably, keeping in mind that a monitor, CRT or video system is normally included in most computer systems, the output present invention may, in addition to or in place of such video systems, include a specially designed, lighted display rack which highlights or backlights possible matches on the rack for the operator's further visual examination and/or use. Such a display rack could be connected directly to a common serial, parallel, USB or other communications port (wired or wireless) found on many personal computers, perhaps according to the description contained in the second example below. Thus, the invention is highly adaptable and, to the extent that laptop personal computers are easily transported, mobile. Moreover, these lighted display racks could be installed as kiosks in retail stores, incorporated in vehicles or even specially designed to be transported in a convenient carrying case. Ultimately, the primary goal of these displays is to simplify and enhance the use of the system by its intended operators—consumers or inexperienced employees who have not been trained in the nuances of the identification process in question.

Alternatively or additionally, a color-coded, number and/or letter system could also be used to help user's identify a location where the object which has been identified can be found. Essentially, the specific colors, numbers or letters would represent specific areas on the display board in order to direct the user to the appropriate location (i.e., the display rack would be presented as a grid, and the identification system output would be tailored to that grid). Each display panel has known locations which include storage space for the particular object in question. The artwork overlay for each location on the panel would have appropriate information on it for easy identification. Using this set up in conjunction with the software described elsewhere in this application, a simple method for providing the exact location of the identified object is achieved.

Still other automated devices, such as movable, motorized subpanels (which would revolve so as to present one location or a series of related locations to the user) or a robotic retrieval system (which would rely upon a combination of motors in two or three dimensions to cause an arm-like device to find, grasp and move the object to a desired location), could be included to further enhance the identification system. Integration of such an automated system with the historical logs and/or networked capabilities of the system mentioned above would ultimately allow for the seamless retrieval, re-ordering and/or restocking certain items on the display board.

Expanding even further upon the notion of an automated system, the invention may be adapted for inclusion in or with other known systems, in order to further process or utilize the object that has been identified. For example, if the invention is devoted to key-blank identification, the system could be operatively associated with any known key replication device so as to create a cohesive, fully automated system that can be used directly by a consumer, rather than a skilled locksmith or technician. Such a system would be akin to a vending machine in which the consumer answers a few questions about easy-to-observe physical traits of the key, then places the key in a designated position and has the original and a duplicate returned out of the machine only a few moments later. This vending-machine concept might include a robotic arm to retrieve the identified key blank, to position the blank properly within the associated key replication system and to deliver the keys to the operator. Thus, through this integration of a separate system to produce an end-result, the identification system of the present invention represents a useful means—in a wide array of different situations—to further enhance the user's experience without the need for employee intervention. In short, the invention contemplates complete, integrated and automated systems, accessible by average consumers, in order to further process the identified object.

FIG. 1 shows a schematic, generalized representation of the present invention. Identification system 10 includes input device 12 operatively associated with an operator interface system 14. Interface 14 interacts with database means 16 so as to produce the output described above. Logic system 14 then produces and displays the appropriate outputs on display panel 18. Concurrently, the output from database means 16 may also be sent to a device driver 20 in order to transform the output into a compatible set of instructions for display board 22. Notably, the interface 14, database means 16 and device driver 20 can all functionally be part of a single computer processing unit. By the same token, display panel 18 could represent a standard CRT, monitor or other video system that is commonly sold as part an over-the-counter personal computer system. Display board 22 is optional, and it can be constructed from common components, including LEDs, diodes and related circuitry widely available in consumer electronics stores. The software package, that can be specially developed utilizing known software programming techniques, operating systems and device drivers, can be downloaded or accessible via a computerized network or provided via standard distribution channels and means (burned to CDs or DVDs, provided on an integrated circuit, etc.). Thus, it can be seen that invention 10 can be easily implemented without the need for expensive or highly specialized equipment.

The configuration shown in FIG. 1 will have particular applicability to the Key Identification System described below, although it must be understood that other configurations of the invention, consistent with the principles described herein, are also possible. Likewise, the references to specific elements in this descriptive paragraph must be read in light of the entire disclosure, including the examples provided below. Finally, any of the other elements described above could be placed in, or substituted for the elements of, the schematic system in FIG. 1. For example, in the event that a secondary system (such as a key replication device) was included, this secondary system would be operatively associated with the device driver 20 in place of or in parallel with optional display board 22. Likewise, the various software functionalities described herein are generically encompassed by reference element 18.

While the basic principles of the invention have been set forth above, the examples below will provide detailed information on certain aspects of the invention. It should be readily understood that these examples below are merely illustrative of the larger invention, described and claimed herein. In essence, these examples are provided to allow for further exploration on specific aspects of the invention. Significantly, these examples are not mutually exclusive, and it is possible and expected that the elements, methodology and rationale described in any one of the examples may be incorporated into the disclosure of the other examples without departing from the inventive principles. Finally, while specific elements may be identified, those skilled in the art will readily appreciate that any equivalents for these elements are expressly contemplated and covered by this disclosure.

Example 1

The Key Identification System (KIDS) is an innovative method for key identification in the master key replication process. Overall, it provides for increased accuracy and efficiency in crucial stage of key replication—the identification and provision of an appropriate key blank. Through its reliance upon the user to inspect and provide inputs about the key that is to be replicated, errors in the operation of complex computing and mechanical equipment (such as the light scanners or numerous key blank test boxes described in the background of invention) will be avoided. The hardware required by the system can be purchased or constructed from readily available items, whereas and the software applications are easily available for distribution through well-known channels. Thus, the essential elements of the invention provide a novel method of key identification and replication that can be quickly and readily adopted by the industry. Moreover, because the invention can be readily adapted into familiar graphic user interfaces and other well known input devices (touch screens, mouse pointers, printed results, etc.), the system itself will be particularly user-friendly.

KIDS also contemplates the use of other data, such providing information regarding the "reverse values" of key blanks, in order to fulfill its goals of accuracy, efficiency and simplicity. Reverse values is a term in the art, and it generally refers to the concept that the grooves on either side of a given key blank may be the exact opposite of the grooves on another key blank, thereby making the two key blanks interchangeable so long as the one is turned upside down prior to its use. By identifying the key blanks that are "reverse values" of other key blanks, retailers may be able to pare down the number of key blanks needed in inventory.

Further, as identified above, KIDS utilizes a storage database to record: (a) failures in identification, (b) use of the system, (c) the number of blanks identified/provided/used, and/or (d) demographic information about the users themselves. Likewise, the database could retain how often "reverse value" key blanks were required. Information in such a database could be uploaded via the internet and compiled for a number of locations and/or for a chain of retail locations for further use and analysis. In a similar fashion, any updates to the database and other software required by the present invention could be supplied via download internet connection, separate disk or CD, or by way of receiving an altogether new component having the required information thereon.

The programming required by the database and associated software applications can be achieved using known programming languages and techniques. Specifically, the software could be implemented using database platforms and operating systems. Alternatively, the program could be constructed from any known computer code such as Active X, XML, C+, etc., and in line with object-oriented or other known programming strategies. Additionally, artificial intelligence concepts could be implemented so that the system would essentially adapt to learn from mistakes or frequent user inputs or preferences, thereby making future operation of the system even more efficient and/or user-friendly.

One specific means for user inputs would be by way of a Graphical User Interface (GUI) having drop down windows for various information fields. The results of possible key-blank matches could then displayed on a video screen, as well as on the selectively lighted display board. The operator can simply enter the known information about the key into the appropriate window of the GUI. The database algorithm could also prompt the operator with a series of pertinent questions for the user to answer, thereby leading to necessary inputs. FIGS. 2-14 depict, by way of "screen snapshots," possible arrangements for a particular GUI, although the specific data windows suggested therein are not meant to limit the potential areas of inquiry (for example, key blade length, thickness or presence/position of a groove are all other potential areas of information that could be included in the GUI).

Alternatively or additionally, the aforementioned touch screens or buttons could be used to further simplify the user's experience. In these cases, the software would need to request inputs in such a fashion as to be compatible with the user's ability to enter the information. That is, if only finite number of buttons are provided as the user's means to input information, the software must be written and designed to offer choices to the user that correspond to those buttons (e.g., a series of questions such as, "Press 1 if the key is a house key, press 2 if it is another type" or the like).

The information input into the system will enable the algorithm to select the appropriate key-blank(s) for replication from the master key. All identified key-blanks can be highlighted by the display rack for easy retrieval by the user. Preferably, based upon these inputs, a single key-blank will be indicated and used by the operator of the key replication system in order to reproduce the master key. When no single key is an exact match, a series of key-blank possibilities may be identified. In the event an automated retrieval system is incorporated, the software can be programmed to afford the user with the option of retrieving all of the possible matches or entering additional inputs to further winnow down the potential matches.

Using a database to identify key blanks affords the user with the added bonus of learning additional information about the blank itself. Even if the key blank is identified with only a few inputs/answers to queries, the system can still display a multitude of information about the blank for the user, including but not limited to: key identification by usage or type (e.g., house key, padlock key, cabinet file key, automotive key, recreational vehicle key and agricultural/tractor trailer key), identification of automotive keys by make, model, or year, identification by manufacturer or part number (for example, ILCO number, ACE stock number, UPC code and/or the Jaw Selection), level of available supplies, system usage statistics and notation of the transponder number when applicable. Moreover, the system could also display other information about related products or other items that may be of interest to the user. For example, if the key blank is identified as a padlock key and the system is installed in a hardware store, padlock accessories also sold by that store could be identified in the output of the system.

In order to achieve these goals, the KIDS interface preferably consists of a GUI similar to those pictured in FIGS. 2-7. This arrangement for a GUI prompts the operator for inputs by presenting blank information fields in combination with drop down menus to identify all of the possible choices available to the user. These choices will be modified by the program as additional information is input, and the user can actually see the possible matches and other information in real-time on the basis of the answers provided. The GUI can be displayed on a multitude of general computing devices including but not limited to general personal computers, personal digital assistants (including those combined with or functioning as cell phones), many hand-held devices, and numerous other user interfaces. The user interface would be programmed to contain multi-lingual support so that users have the option of choosing the language with which they are most comfortable.

KIDS may also be equipped with a software application to provide inventory assistance to the retailer or distribution outlet involved in master key replication. The inventory information stored within the database provides real-time and/or offline access to a variety of variables, including but not limited to inventory levels of all key-blanks, the make and areas of use for the blanks, and recent or expected sales activities (based on projections from the historical information). Additionally, the inventory system could be configured to notify the operator of the need to restock or to actually perform automated restocking of key-blanks by having the system electronically order the necessary items. Furthermore, this inventory notification system provides information for restocking on a local store basis, regional basis, or by national store brand.

A machine-recognizable object verification system could be incorporated into the system, either to compliment the inventory system or to serve as a stand-alone element. Here, the master object would possess indicia of recognition which would serve at least one of two purposes: (i) to verify that the key-blank that was identified has, in fact, been properly retrieved, and/or (ii) to prompt the inventory system that a particular key blank has been selected and to make an appropriate notation therefore. Ideally, this indicia of recognition would be some sort of machine vision marking on the key blank (e.g., a bar code) coupled with an appropriate detector integrated as part of the user interface (e.g., a bar code scanner located on the kiosk console with an output means to indicate whether or not the blank selected matches the one previously identified by the database). By the same token, such indicia could be radio frequency identification means (e.g., small chips embedded into each blank) or other types of machine readable/recognizable schemes. Use of this sort of verification system would increase the accuracy of the identification process and, to the extent it may be linked to the inventory functions described herein, also serve to enhance that functionality.

KIDS may also include a software application to provide updates to a variety of system software packages including but not limited to the key-blank index or the database selection algorithm in a variety of means including but not limited to real-time downloads, offline configuration disks and other means known in the art. The update software application may also be able to provide other applications (either embedded within the database or as seemingly stand alone programs) to further the efficiency and capabilities of the key identification system.

For example, KIDS may also be equipped with a "Help System" which would explain and/or demonstrate a variety of concepts to the user. These concepts could include, but are not necessarily limited to, an explanation of the key identification process, a trouble shooting guide for the retailer's or distribution outlet's cutting machine, general help with the visual inspection procedure, and/or general help with the hardware and software systems involved in the key identification process.

The historical log application associated with KIDS provides a detailed tracking mechanism for numerous variables. Essentially, this application could act as an auditable function for monitoring and recording information about the use, inputs and results generated by KIDS. In particular, the historical log could includes, but is not necessarily limited to, data for each sale of a certain key-blank type, any required re-cuts due to miss-identification of the key-blank, any required re-cuts due to a miss-cut, lost sales due to lack of key-blank, lost sales due to lack of substitutions for key-blanks, and any miscellaneous information the operator deems pertinent to the sale or lost sale. Other simple and easy functions provided within the framework of the historical log application would involve adding or modifying the data fields, resetting the logs, extracting customized reports from the data and selectively toggling between tracking modes.

It is also possible to utilize KIDS as part of a larger system for storing, shelving, or putting away key blanks, in addition to the aforementioned identification functionality. By inputting information into the system about the appropriate key blank (thereby illuminating an LED on the display rack), the retailer may identify and stock the appropriate storage position of the key blank accordingly. Furthermore, the software implementing the database engine of the present invention could be further modified to have a driver or subroutine which interacts with inventory software so as to add further seamlessly coordinate both systems (inventory and identification). Mechanical means could also be implemented to automate the retrieval. Moreover, by using robotic retrieval systems in conjunction with appropriate software and drivers which recognize and reorder inventory stocks without user intervention, the restocking of key blanks (or other objects) could be completely automated. To be certain, such additions may add a level of complexity to the invention; however, these complexities would be mitigated by the corresponding increase in user-friendliness and efficiencies thereby achieved.

Such an automated machine would utilize the key identification method and direct a retrieval unit to automatically pick the key blank from a storage location. After the key blank is picked, the retrieval unit will move to the key cutting position. The retrieval unit will then proceed to integrate with the key cutting unit to cut the key form on the key blank. The fully automated machine expands on the application of software created for key identification.

A semi-automated method is also possible. This would utilize either the simple method mentioned above or the integrated display panel. With this semi-automated method, the key is identified and selected from the hook rack and manually placed into a key holders or fixtures which would then move automatically to the key cutting unit and cut the key blank. After the duplicate key is cut, it would return to the unload position for key removal from the holders or fixtures.

A novel display rack for KIDS is more fully described in the second example below. It should be understood that this display rack should have particular utility with the system described herein, although the system itself does not necessarily require this rack. Indeed, substitutes for this rack are possible, without departing from the underlying inventive principles of KIDS. However, use of this sort of rack should increase the user's sense of satisfaction and accuracy by providing him or her with a tangible result that can be inspected and compared to the original.

The key identification system utilizes a general computing platform to provide the database storage and computation, graphical user interface (GUI) for the operator, the display rack controller, and any and all other components which need the assistance of a general computing platform. All of the components of KIDS may exist on a single computing machine or on a plurality of computing machines with no requirements on the various implementations in which they may interact and share information. For example, a single general computing device such as personal computer may maintain the database and run the display rack control while a series of personal digital assistants act as operator interfaces to collect inputs, and then transmits the pertinent information via a wireless network with the database result being reflected by the lighted display rack, in conjunction with an appropriate notation for the specific user, which is physically connected to the personal computer (the result could also be transmitted back to the particular user's personal digital assistant). This example in no way limits or restricts the plurality of methods that this system may be implemented or networked, including inclusive hand-held devices and systems coupled to key-cutting devices. Significantly, the interchangeability of various consumer-oriented computing devices permits widespread implementation of the invention in a variety of environments, including situations where such devices are presently available, in addition to other situations where KIDS would be provided as a new, stand-alone installation (such as in an integrated kiosk). This interchangeability should also minimize expenses, while at the same time providing a known platform of operation that is familiar to the user (and/or proprietor of the establishment in which the KIDS is installed).

As discussed above, it is contemplated to utilize the present invention with an associated key-cutting device. Such a combination could be as simple as the retailer identifying the key blank with the present invention and physically placing the key in a key-cutting device for copying against the master key. Alternatively, the combination could include an auto-retrieval system that retrieves the key blank and forwards it to a key cutting device to minimize human intervention, to decrease likelihood of mistakes or injuries and to increase the overall user-friendliness of the system. In such a completely automated system, cutting information would be sent to the key cutter from an interface at the key cutting station.

Finally, as alluded above, the KIDS system is specifically designed for implementation as a free-standing, consumer interactive kiosk. The user (person with a key to be copied) interacts with the kiosk by identifying any known information from the key and narrowing the possible key blanks. In order to assist in measurement of the key's length or thickness, a spring-loaded, mechanical key measurement device could be integrated into the kiosk itself. Additionally, the display rack would be mounted on or near the kiosk so as to provide the consumer with a simple, user-friendly experience. The visual display (i.e., the monitor, CRT or video system) would show a picture of the identified blank in order to permit visual verification by the user, possibly by showing a 1 to 1 scale outline of the blank. Once confirmed, the user could also place the master key into an interface that translates the key cutting information to the key cutter so as to make a duplicate key in the event that the kiosk were operatively associated with a key cutting device, as described above.

As mentioned repeatedly above, it should also be clear from this disclosure that the present invention has numerous additional uses than solely for a key blank identification, storage, or cutting systems. The present invention is equally applicable to other applications wherein a multitude of possible master objects having nuanced characteristics must be identified from an original provided by the user. For example, the present invention could be used to store and retrieve nuts and bolts or other fasteners. If a user comes into a store with a specific nut or bolt having a specific size, thread count, etc., the present invention can be used to identify an appropriate replacement, whether an exact match or just a suitable substitute. Thus, it is clear that the present invention has storage and identification capabilities for any number of objects.

Example 2

The display rack represents another unique aspect of the identification system of the present invention. It is comprised of various individual components. Each of these individual components is assembled together to form a single unit. A flexible system can be created and modified easily by grouping a number of KIDs input stations to a single display rack and/or database (perhaps relying on a computerized network). These units will be integrated with other electronic hardware and software also mentioned elsewhere in this application.

Figure 15:
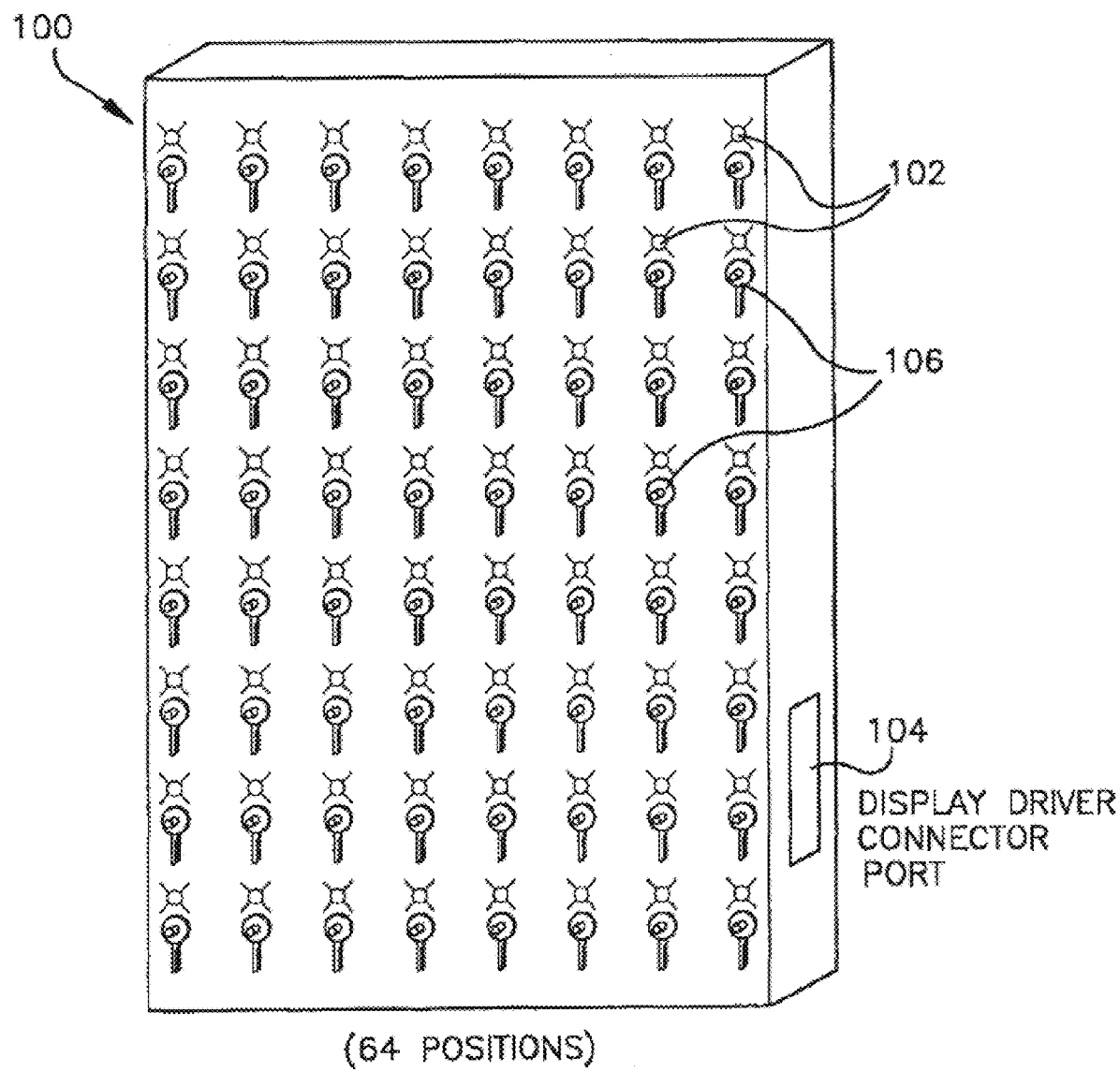
FIG. 15 is a possible embodiment for a key identification light board where lights illuminate appropriate portions of the board to identify potential key-blanks.

The basic structure of the Integrated Display Panel is shown in detail in FIG. 15. Essentially, rack 100 comprises an organized grid of light sources 102, such as LEDs, incandescent bulbs or the like. These light sources are selectively wired, in a manner consistent with the description below, and arranged to interact with the system by way of a single display driver connector port 104. Individual product items 106 can be stored and/or displayed proximate to the appropriate light source 102. Obviously, the particular products and light positions must be appropriately coordinated with the output of the database in order to insure proper functioning of the rack 100 and the system in general. This is only a single embodiment, and in no way limits any other possible embodiments of the display rack.

Figure 16:
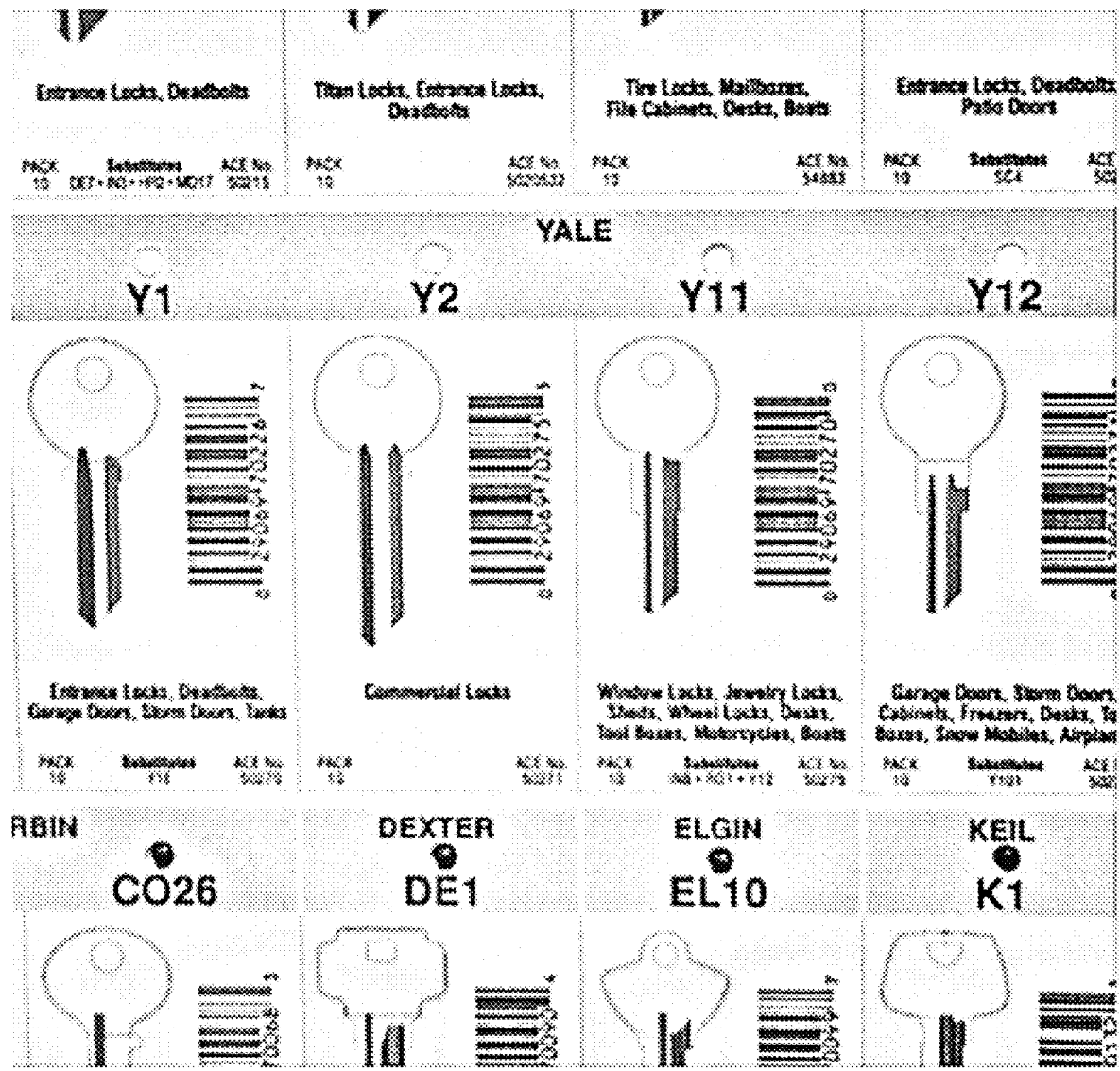
FIG. 16 shows an embodiment of a display board surface for displaying the key blanks available and identified by the key blank query.

In turn, FIG. 16 shows a display board surface adapted for particular use in a key identification system. The display rack of FIG. 16 comprises pictures of specific key blanks, bar codes to assist in the identification, inventory and tracking of each key blank, a code number for each key blank, a description of the key blank including uses associated with that key blank, and an aperture in which an LED can shine through so as to identify the appropriate key blank in response to a query. Alternatively, each particular location on the grid could be of a translucent material, so as to allow for the backlighting of the appropriate key location(s).

In either instance, display rack 100 provides for a visual aid to the operator for ease-of-use during key identification and replication. The highlighted rack will indicate, via light source 102, the appropriate objects required by the user/system. This system of indication increases efficiency and helps to reduce operator errors.

As added features, the display rack can utilize a multi-cluster LED display, which provides for multiple colored LED's on a single location to identify whether the selected object is the true original or a satisfactory substitute therefor. The display board itself is customizable so that individual retail store or distribution outlets could change its appearance to fit their individual needs, including the ability to switch the precise objects for identification (i.e., to convert the display from a key identification system to a fastener identification system through concurrent changes to the software and items on the display panel). Further, it is possible to program the light display or any additional attached light display to scroll a marquee text message (for example, to indicate whether the system is operational, to simply to display general advertising, etc.). It is preferred that several boards can be connected to display any number of key blanks available for sale. Finally, as alluded to above, the display board could be incorporated into a foldable, collapsible or otherwise transportable design (i.e., the board could be integrated to fit within a carrying case, perhaps even in conjunction with the other elements of the system itself).

Notably, the wiring required to light all of the LEDs is actually rather complex, especially in the event that additional display panels are added to the system. Furthermore, the high speed switching needed to create and maintain the appearance of multiple, lit locations on the board requires relatively expensive drive electronics.

To overcome these difficulties, the display rack 100 of the present invention utilizes a combination of shift registers. Shift registers are readily available integrated circuits that can control a number of outputs (typically 4 or 8) with minimal input signals. Because they are designed for use in series, any number of shift registers can be placed in series to drive as many LEDs as desired.

Figure 17:
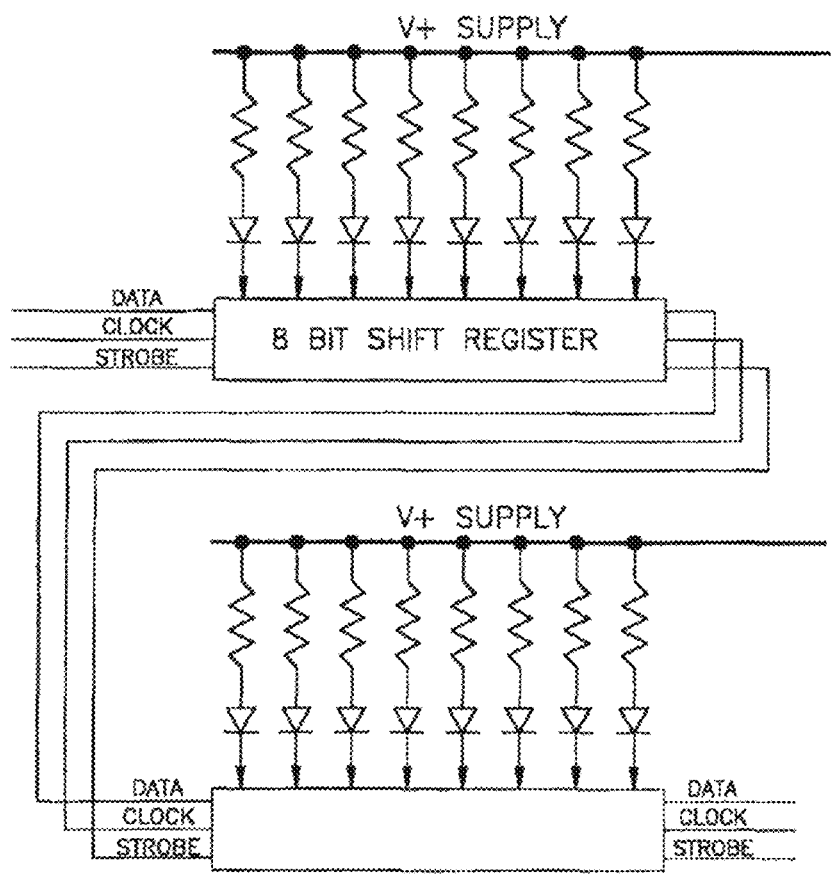
FIG. 17 shows a possible block diagram for 2 display panel sections designed to utilize 8 bit shift registers.

FIG. 17 shows a block diagram for 2 display panel sections which utilize 8 bit shift registers. A power supply is provided to each register, along with 3 input signals: data, clock, and strobe. Significantly, a strobe signal would normally be needed to transfer the data from the shift register to a buffer in the shift register (the buffer allows all the outputs to be changed at the same time by the strobe signal), but through the use of a clock signal in place of a strobe signal/buffer combination, rapid shifting of new data sets can be achieved. Thus, the clock signal eliminates the need for a strobe signal and buffer because of the speed at which data is shifted. For example, a panel with 320 individual LEDs can be made with only 40 shift register integrated circuits wired in series and without the need for individual buffers or strobe signals.

Additionally, a separate computer would normally be needed to receive data from the database computer and continuously scan the LEDs at a high speed in order to give the appearance that several LEDs are illuminated at the same time. However, the display rack of the present invention only needs to be altered when its input data (from the database) changes. Thus, the new shift register based embodiment of the inventive display rack only needs to be driven when the data changes. Most of the time it simply displays the most recent data, such that the reduced drive requirements can actually be met by the database computer itself, and without the need for a separate computer.

Unfortunately, most commercially available database software has little (if any) support for custom electronic hardware interfaces such as shift registers. Thus, the display rack of the present invention relies upon a wired or wireless communications port (as mentioned above) found on almost all commercially available personal computers. In doing so, it will be understood that some changes are required insofar as printer ports have appropriate voltage levels for a shift register but don't possess suitable driver software in standard PC software development packages, whereas serial ports have adequate software support but needs some voltage level conversions.

Figure 18:
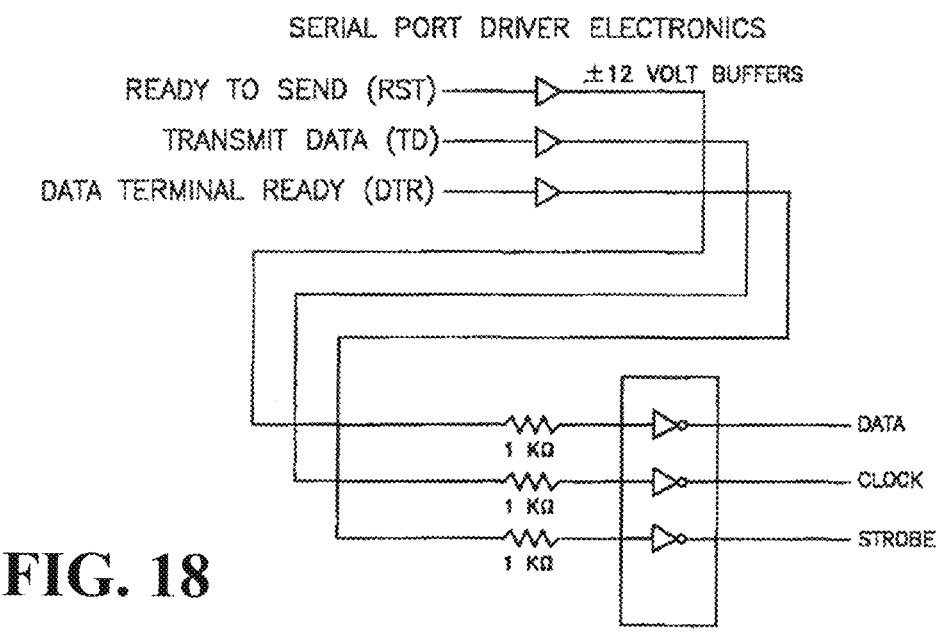
FIG. 18 shows a possible block diagram of the serial port output signals, along with the level conversion hardware needed to drive the shift registers.

FIG. 18 shows a block diagram of the serial port output signals, along with the level conversion hardware needed to drive the shift registers based on a signal received from the serial port. A standard integrated circuit, such as a 74HCT04 Hex Inverter, receives data from the database means. Internal diodes clamp the input voltage to 5 volts positive and 0 volts negative within the integrated circuit, while the series 1 K ohm resistors limits the current to protect these diodes. Significantly, all of these devices are readily available in most consumer electronics stores.

Standard serial port drivers allow program control of the Ready To Send (RTS) and Data Terminal Ready (DTR) signal lines. The Transmit Data (DT) line, however, is driven by a special shift register within the serial port hardware. The serial output shift register data was used as a clock signal. The output was programmed with 1, 2, 3 or 4 pulses and that data was shifted out to the clock inputs of the driver electronics. This approach resulted in 1 to 4 clock pulses at the display. The output driver program in the database sequences between setting the data line high and low, as well as sending out clock pulses to get the desired pattern of LEDs on the display to illuminate.

Using this aforementioned set up, it was possible to connect and control the display rack 100 relying upon standard, easy-to-obtain electronics and the serial port of a personal computer. In this manner, the invention can be implemented in a multitude of ways and without the need for multiple computers (i.e., one to control the display rack and another to run the database) or extraneous electronics (i.e., a strobe signal and buffer). The invention also contemplates the creation of appropriate driver software so as to permit connection of the printer port, or other communications port, directly to the shift registers (as mentioned above, voltage correction would not be necessary). In such instances, those familiar with programming techniques should be able to construct appropriate code for this set up.

Example 3

The identification system of the present invention relies upon the aforementioned database means for comparing specific observed traits of an unknown object with accumulated data concerning those same traits for a wide range of known items. As such, the database means forms an indispensable part of the inventive system. The data itself is organized into a number of standardized fields which correspond direct to the specified trait being inputted by the user.

As mentioned above, the programming required by the database and associated software applications can be achieved using known programming languages and techniques. The software could be implemented using database platforms and operating systems. Alternatively, the program could be specially written utilizing object-oriented or other known programming strategies and computer codes such as Active X, XML, C+, etc. Artificial intelligence concepts could be implemented so that the system would essentially adapt to learn from mistakes or frequent user inputs or preferences, thereby making future operation of the system even more efficient and/or user-friendly.

The size, complexity and operational configuration of the database will depend upon the resources available to the system. Ideally, the inventive system would include a dedicated personal computer, such that the database takes the form of a computer application, locally installed on the hard drive of that computer. It is believed that this arrangement will simplify the installation and operation of the system, insofar as many users are familiar and comfortable with utilizing software on a regular store-bought personal computer system. Nevertheless, those who are familiar with computer systems will recognize a number of other possible set ups for the database, all of which are encompassed by this disclosure and intended for inclusion in the claims below.

In its broadest form, the database itself might even comprise simple, printed tables of information, conveniently arranged and displayed on the user interface itself. In this type of set up, the interface would be a display panel contained on a kiosk wherein detailed written instructions are given to the user. For example, the user might be presented with four booklets of tables, with each booklet corresponding to the intended use for a key blank (one booklet for house key blanks, one for cars, etc.). Upon identifying the proper booklet, a series of questions would be presented to the user, such as length of the key blade, identity of the previous blank/key manufacture (if discernible from the master key) and so forth. The booklet would instruct the user which page to turn to for further information, and each table would contain an input code or some other identifier for the user to provide to the system. These codes or identifiers would then be processed by the database means, which would visually display the corresponding master object or objects on an appropriate display rack. Ideally, an appropriate single match could be achieved with only a few basic inputs. Notably, some sort of input device would still be required in order to allow the system to properly activate the display rack (or other means for highlighting the identified blank for the user), and in this particular arrangement, the term database means is meant to encompass the coupling of information booklets/tables with these devices.

Figure 19:
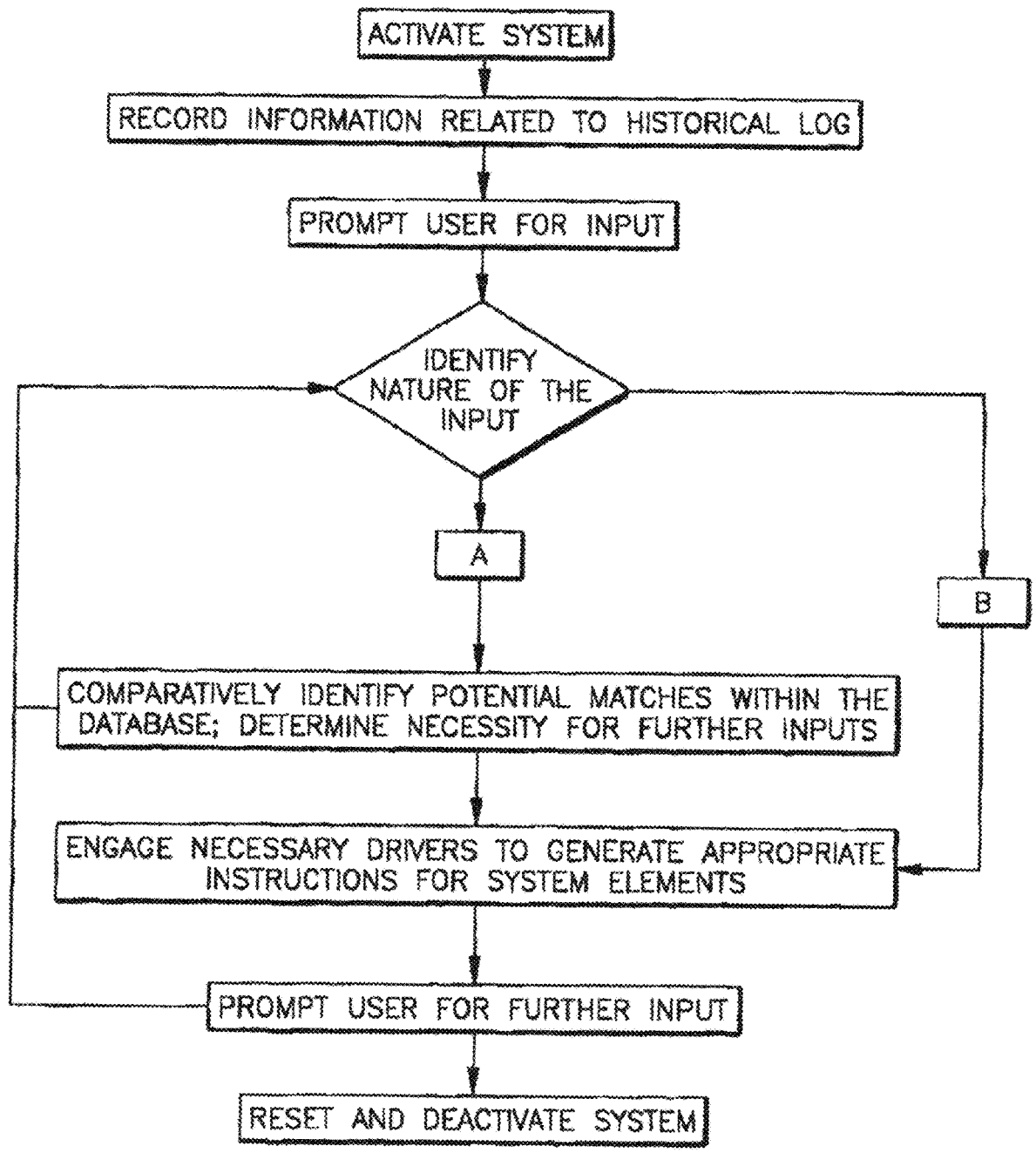
FIG. 19 shows a flow chart for the identification process contemplated by the software of the present invention.

Clearly, this sort of tabular-driven format has drawbacks in terms of misreading the booklets and/or defacing of the booklets themselves; accordingly, a preferred embodiment of the invention involves provision of the software for installation on a computer system which is itself incorporated into the inventive system. The software would be written in a manner well-known to the art of computer programming. FIG. 19 provides a possible flow chart for the identification process required by a key blank identification system.

As seen in FIG. 19, the system is first activated. This step may be accomplished by way of a dedicated on/off button, by a user simply pressing one of the keys on the interface, by way of a motion tracking sensor or by other known means.

Tracking information is then recorded by the software, either through a manual input provided by the user or through a seamless encoding process performed automatically by the program itself. Tracking information can include any number of fields, such as: time, date, location (in the event the system includes a multitude of user input stations) and/or demographic or other information about the user (age, gender, etc.). This information will become part of the aforementioned historical log function, and the program will export data as needed to the necessary portions of the system. Additionally or alternatively, the information being tracked could be related to inventory levels of the master objects themselves, although in this case the program would simply monitor use of the system as the appropriate master object is identified/provided to the user.

The user is then prompted for an input. This input may relate to the object itself, as represented by arrow A in FIG. 19, or the input may be related to the system performance, the system help function, the historical log feature or the system deactivate function, as represented by arrow B. Each specific branch will be described separately below, but in either case, the program must identify the nature of the input and respond accordingly. Also, the input query itself can be achieved through a traditional question-and-answer process or, as seen in the screen shots of FIGS. 2-14, the presentation of the graphical user interface itself can serve to notify and prompt the user concerning the various possible responses (including the specific fields of information possible for inputs related to the object, as in arrow A).

In instances where the input relates to the object itself (arrow A), the program will compare the input with an appropriate subset of data contained within the database. The database may be a separate object within the program structure so as to allow for easy updates without disrupting the remainder of the code itself.

When the input relates to some other request (arrow B), the program will engage the necessary software elements to generate an appropriate response. For example, in the event the input is a request to generate a report regarding specific historical information, the program will (either through an appropriate subroutine, a separate application or other programming device) search and retrieve the required information from the historical log. Likewise, if the input is a help request or an inventory-related function (such as a query related to the number of master objects sold or remaining, a user provided or an automatic, computer-triggered request to reorder certain masters, etc.), the program will identify an appropriate response by the system, in a manner consistent with the steps described below.

Once an appropriate output response has been identified, the program will seamlessly identify the necessary hardware drivers and generate an appropriate output to display the result. In the case of object related information, this output may be a set of instructions sent to the display rack along with a concurrent output for display on the GUI. For example, the object-related results could be displayed in a separate text box on the GUI itself, as seen in the screen shots of FIGS. 2-14; in the form of reduced choices available in a drop-down window also seen in FIGS. 2-14; or in the event that a real-time GUI is not included with the system, in the form of printed results (this option requires inclusion of a printer and engagement of the appropriate printer drivers by the program). In the case of other requests (arrow B), the program may need to initialize a video for display, generate instructions for a standalone printer, create an appropriate display within the GUI itself or engage the necessary network or other functions to respond to inventory related commands and the like.

Finally, after the appropriate results have been displayed, the program determines if the user desires to provide further inputs. Again, it should be kept in mind, especially with regard to object related inputs, that the GUI itself may make this process inherent (i.e., this final step may simply appear to the user to be part of the GUI itself—insofar as the drop-down windows and/or the results of the separate text box appear automatically—rather than as a separate prompt for further information).

Once the program determines that no further inputs or actions are desired by the user, the system itself is reset (this is especially important for configurations which include the display rack) and then deactivated. Alternatively or additionally, the program may automatically provide such a reset command after a certain period of time elapses without an input and/or other pre-determined circumstances occur.

The relative cost, space requirements, packaging and complexity of a laptop or desktop personal computer may actually be very onerous for certain intended applications, especially in instances where the object to be identified possesses a multitude of traits/variables or in cases where the system needs to be installed on a wide number of locations. To reduce the cost and memory requirements of the present invention, a miniature version of the computing system can be developed. This miniature version includes various combinations of screen sizes, formats and functionalities.

Figure 20:
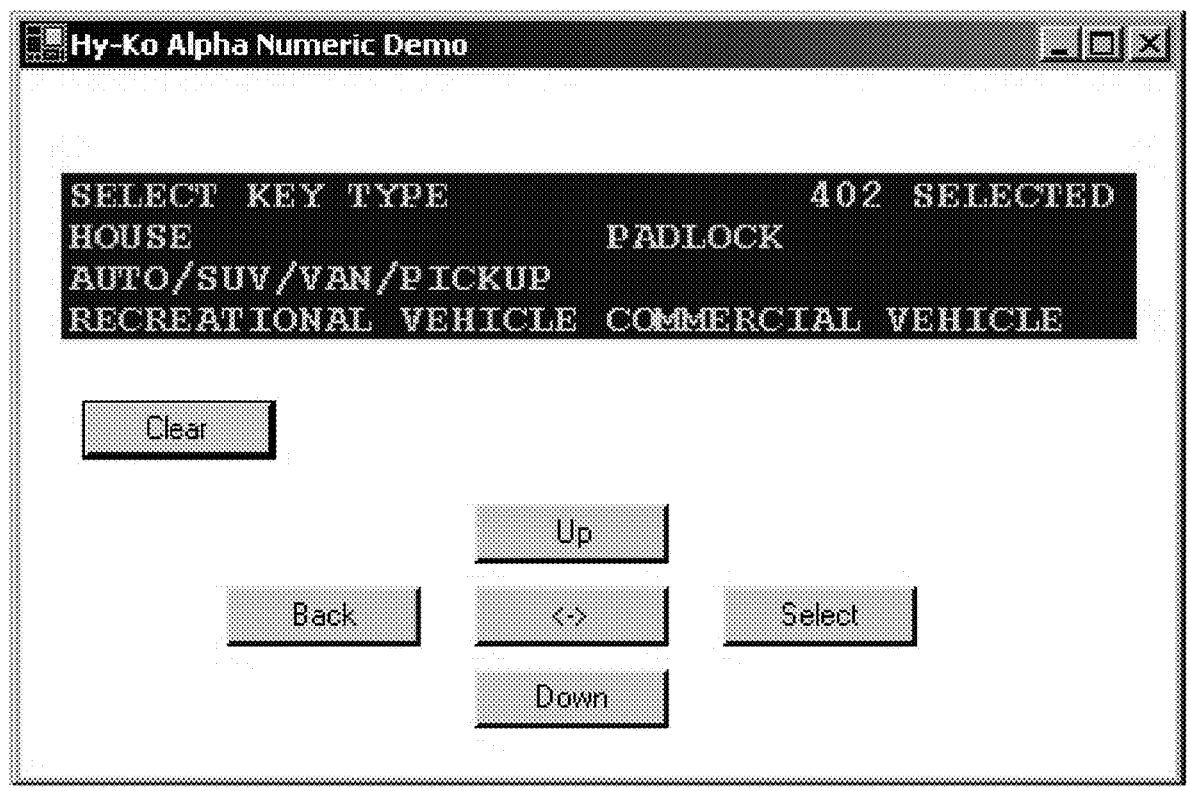
FIG. 20 shows an embodiment of the graphical user interface for a scaled-down version of the computing and display devices of the present invention.

For example, one of these concepts contemplates the use of a very small, inexpensive embedded computer having a four line alphanumeric display and 6 navigation and selection push buttons. FIG. 20 is a screen shot displays the GUI of such a system.

The top line in this system is used for navigation instructions and results. The lower 3 lines are divided into right and left sides and are used to display selection options. The darkened letters highlight which of the 6 possible candidates have been selected. The Up and Down button move this selection up and down between the 3 selectable lines of the display. The "< >" button toggles the selection between the right and left columns. Going up or down beyond the current display limits will cause the display to automatically scroll so that all available options may be selected.

The Select button uses the currently selected item to restrict the total number of selected key blanks. When it is pressed the next lower level of selections is displayed and the total number of keys selected will be reduced.

The Back button moves backward through the selection process. Prior selections will be presented and the number of keys selected will rise. Pressing this key multiple times will get back to the starting point.

The Clear button goes directly to the starting point. The effect is the same as multiple Back button presses but the operation is faster and the operator is assured of having a fresh search space.

Significantly, use of this scaled-down version allows for lower cost installation of the system. Further, because of the reduced memory and system requirements, this miniature version may be ideal for incorporation in field-based identification systems. Such field-based models would be particularly durable and transportable, especially if connected to a computerized network via a wireless link.

The invention has been described with reference to the preferred embodiment. Obviously, modifications and alternations will occur to others upon a reading and understanding of this specification. The claim as follows is intended to include all modifications and alterations insofar as they come within the scope of the claim or the equivalent thereof

We claim:

1. A key identification and duplication system comprising:
a housing including an object verification system configured to identify data related to features of a master key, a key cutting device configured to cut features in a key blank, and a graphical user interface; and a computer including a database that is operative to communicate with said object verification system, said key cutting device, and said graphical user interface;
wherein said computer is operative to:
regulate operation of the object verification system and the key cutting device;
receive input from a user via the graphical user interface wherein said input selectively activates a software application related to the operation of the key identification and duplication system; and
wherein said software application includes at least one of a help system, a tracking function, an update function, and a language mode.

2. The key identification and duplication system of claim 1, wherein said help system demonstrates at least one concept to a retail employee.

3. The key identification and duplication system of claim 1, wherein said help system demonstrates at least one concept to a customer.

4. The key identification and duplication system of claim 1, wherein said at least one concept includes at least one: an explanation of a key identification process, a trouble shooting guide for said key cutting device, general help with an inspection procedure, and general help with hardware or software systems of the key identification and duplication system.

5. The key identification and duplication system of claim 1, wherein said tracking function provides a historical log that provides detailed tracking of at least one of user preferences, marketing strategies, and display settings.

6. The key identification and duplication system of claim 1, wherein said update function provides updates to software applications.

7. The key identification and duplication system of claim 6, wherein said updates are made to a key-blank index and a database selection algorithm to incorporate new or replacement information related to the key identification and duplication system.

8. The key identification and duplication system of claim 1, wherein said language mode allows the user interface display to include multi-lingual support to allow users to optionally choose the language of the user interface display.

9. The key identification and duplication system of claim 1, wherein said object verification system includes at least one of a bar code scanner, radio frequency identification means, and a camera.

10. A key identification and duplication system comprising:
a housing including an object verification system configured to identify data related to features of a master key, a key cutting device configured to cut features in a key blank, and a graphical user interface; and
a computer including a database that is operative to communicate with said object verification system, said key cutting device, and said graphical user interface;
wherein said computer is operative to:
regulate operation of the object verification system and the key cutting device;
receive input from a user via the graphical user interface wherein said input selectively activates a software application related to the operation of the key identification and duplication system; and wherein said software application utilizes a storage database to record demographic information about the users.

11. A key identification and duplication system comprising:
a housing including an object verification system configured to identify data related to features of a master key, a key cutting device configured to cut features in a key blank, and a graphical user interface; and
a computer including a database that is operative to communicate with said object verification system, said key cutting device, and said graphical user interface;
wherein said computer is operative to:
regulate operation of the object verification system and the key cutting device;
receive input from a user via the graphical user interface wherein said input selectively activates a software application related to the operation of the key identification and duplication system; and wherein the user interface display guides the user in duplicating a master key to be copied and displays the progress of duplication of the key.

12. A key identification and duplication system comprising:
a housing including an object verification system configured to identify data related to features of a master key, a key cutting device configured to cut features in a key blank, and a graphical user interface; and
a computing processing unit including a database that is operative to communicate with said object verification system, said key cutting device, and said graphical user interface;
wherein said computing processing unit is operative to:
regulate operation of the object verification system and the key cutting device;
receive input from a user via the graphical user interface wherein said input selectively activates a software application related to the operation of the key identification and duplication system; and
wherein said software application includes at least one of a help system, a tracking function, an update function, an override function, and a language mode.

13. The key identification and duplication system of claim 12 further comprising a machine-recognizable object verification device in communication with the database for scanning a selected key blank and indicating whether or not said selected key blank matches a key identified by said database.

14. The key identification and duplication system of claim 13, wherein a plurality of key blanks are positioned on a storage display adjacent the housing.

15. The key identification and duplication system of claim 12 wherein said help system demonstrates at least one concept to a retail employee.

16. The key identification and duplication system of claim 15, wherein said at least one concept includes at least one: an explanation of a key identification process, a trouble shooting guide for said key cutting device, general help with an inspection procedure, and general help with hardware or software systems of the key duplication machine.

17. The key identification and duplication system of claim 12, wherein said help system demonstrates at least one concept to a customer.

18. The key duplication machine of claim 12, wherein the graphical user interface guides the user in duplicating a master key to be copied and displays the progress of duplication of the key.

* * * * *